US012369713B2

(12) United States Patent
Salvadori

(10) Patent No.: US 12,369,713 B2
(45) Date of Patent: Jul. 29, 2025

(54) METHOD FOR MANUFACTURING A PIECE OF FURNITURE

(71) Applicant: ALFA HOLDING DI ANNARITA CAPONI E C. SAS, Pisa (IT)

(72) Inventor: Fabio Salvadori, Casciana Terme Lari (IT)

(73) Assignee: ALFA HOLDING DI ANNARITA CAPONI E C. SAS, Pisa (IT)

( * ) Notice: Subject to any disclaimer, the term of this patent is extended or adjusted under 35 U.S.C. 154(b) by 0 days.

(21) Appl. No.: 18/025,910

(22) PCT Filed: Sep. 13, 2021

(86) PCT No.: PCT/IB2021/058321
§ 371 (c)(1),
(2) Date: Mar. 12, 2023

(87) PCT Pub. No.: WO2022/054017
PCT Pub. Date: Mar. 17, 2022

(65) Prior Publication Data
US 2023/0363533 A1 Nov. 16, 2023

(30) Foreign Application Priority Data
Sep. 11, 2020 (IT) ........................ 102020000021613

(51) Int. Cl.
*A47B 96/20* (2006.01)
*A47C 5/12* (2006.01)
*B68G 7/02* (2006.01)

(52) U.S. Cl.
CPC .............. *A47B 96/206* (2013.01); *A47C 5/12* (2013.01); *B68G 7/02* (2013.01); *Y10T 29/481* (2015.01); *Y10T 29/49888* (2015.01)

(58) Field of Classification Search
CPC .............................. Y10T 29/481; Y10T 29/48
(Continued)

(56) References Cited

U.S. PATENT DOCUMENTS 5,385,385 A 1/1995 Silverman
8,158,249 B2 4/2012 Greer
(Continued)

FOREIGN PATENT DOCUMENTS

CN 201094456 Y 8/2008
DE 28 50 342 A1 5/1980
(Continued)

*Primary Examiner* — Sarang Afzali
(74) *Attorney, Agent, or Firm* — Maschoff Brennan

(57) ABSTRACT

A method for the production of a piece of furniture such as a seat, a bed, a table, the piece of furniture including at least one furniture component (10), the method including the steps of making a blank (11) of expanded polystyrene (EPS) with density between 15 and 25 kg/me, the blank (11) being configured to act as a core for the furniture component (10); providing an interface surface (12) in the blank (11); making a rigid insert (13) in rigid material having an engagement portion (14) configured to engage with the interface surface (12) of the blank (11) and a first connection portion (15) opposite the engagement portion; joining the rigid insert (13) and the interface surface (12) so that the engagement portion (14) is engaged with the interface surface (12) and the first connection portion (15) faces aside opposite to the blank (11); coating the blank (11) and the rigid insert (13) by at least one coating layer (30) of polyurethane material, so that the coating layer (30) completely covers the blank (11) and the insert (13), with the exception of at least one part (16) of the first connection portion (15).

10 Claims, 19 Drawing Sheets

(58) Field of Classification Search
USPC .............. 297/451.8, 451.11–451.13, DIG. 2; 29/91.1, 91
See application file for complete search history.

(56) References Cited

U.S. PATENT DOCUMENTS

| | | | | |
|---|---|---|---|---|
| 8,696,067 | B2 * | 4/2014 | Galbreath .......... B60N 2/01508 297/452.1 |
| 2011/0217480 | A1 | 9/2011 | Salvadori |
| 2015/0096257 | A1 | 4/2015 | Sinnathamby et al. |
| 2015/0176274 | A1 * | 6/2015 | James ....................... E04B 1/08 52/696 |
| 2016/0367032 | A1 | 12/2016 | Lee |
| 2017/0211268 | A1 | 7/2017 | Eichhorn et al. |
| 2020/0029699 | A1 | 1/2020 | Brandtner et al. |

FOREIGN PATENT DOCUMENTS

| | | | |
|---|---|---|---|
| DE | 198 53 212 | A1 | 5/2000 |
| EP | 2 346 374 | A1 | 7/2011 |
| EP | 2 660 416 | A1 | 11/2013 |
| JP | 2001-299511 | A | 10/2001 |
| JP | 2017-206077 | A | 11/2017 |

* cited by examiner

Fig. 10
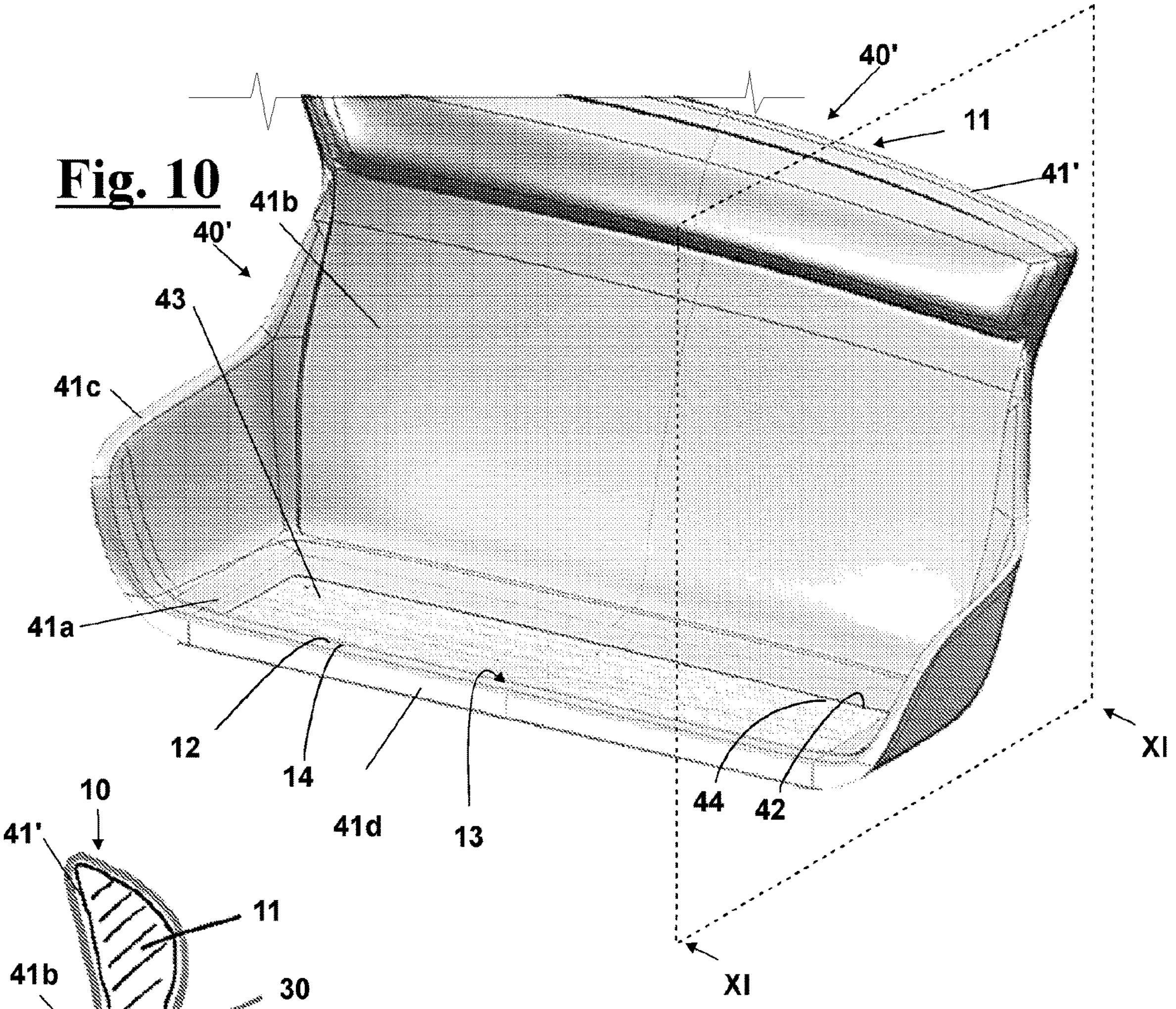
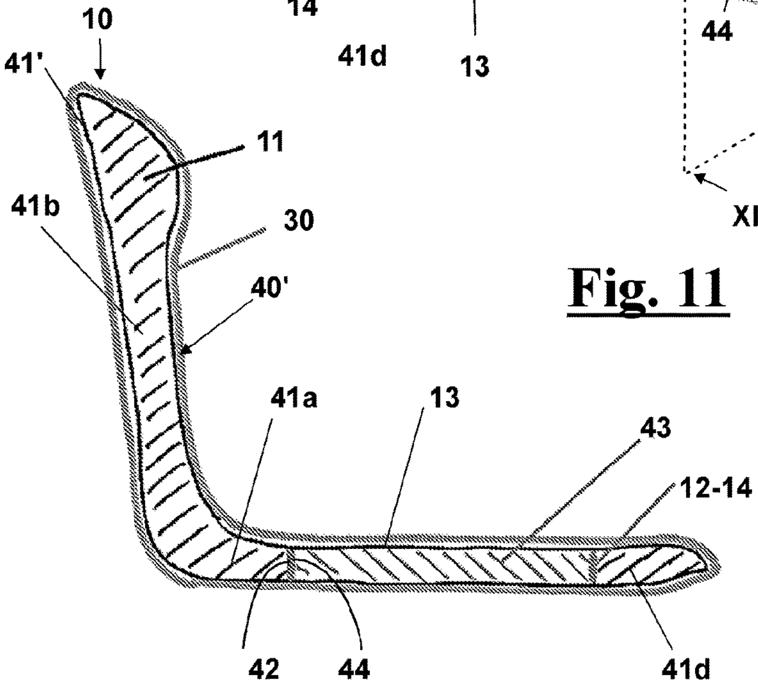
Fig. 11

Fig. 14
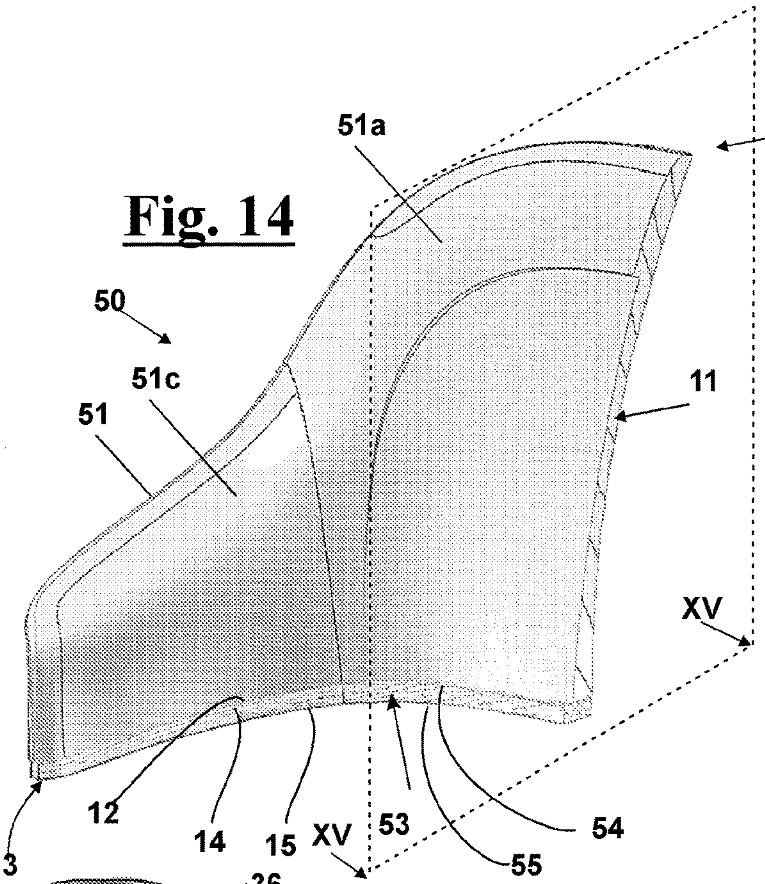
Fig. 15
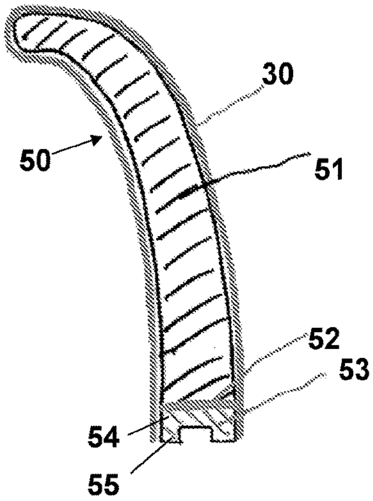
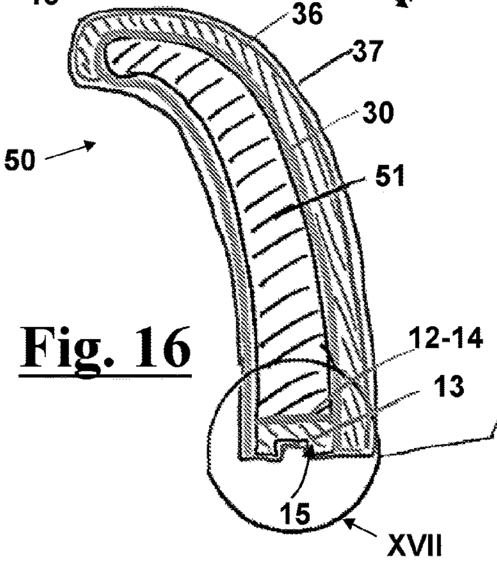
Fig. 16
Fig. 17
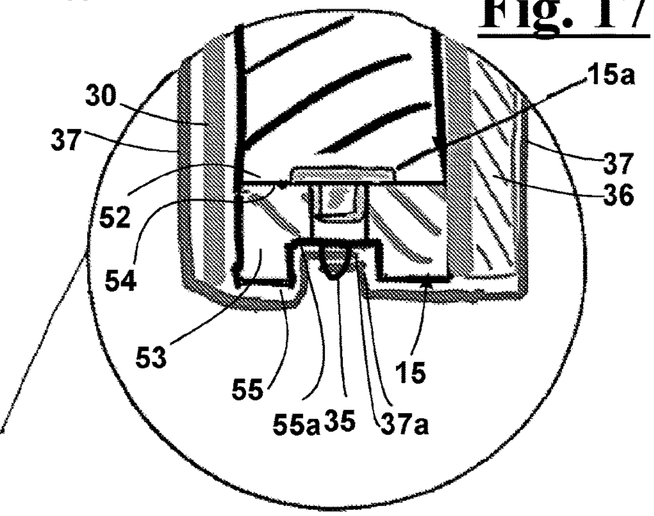

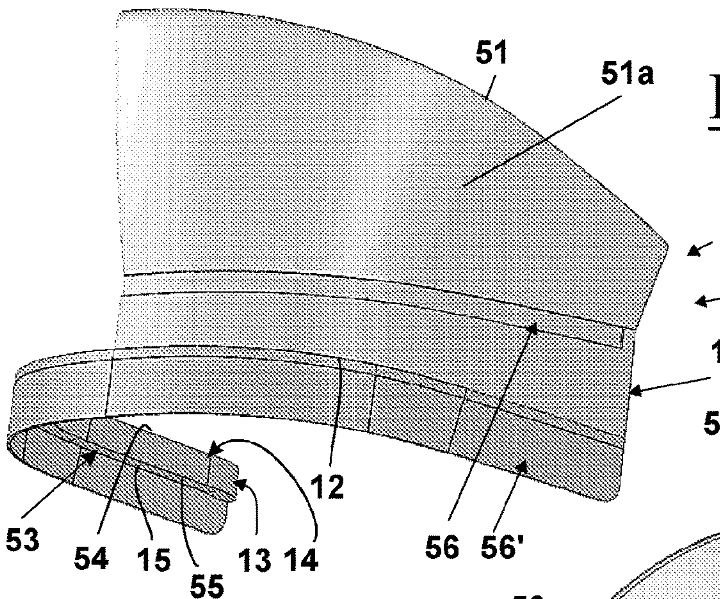
Fig. 18
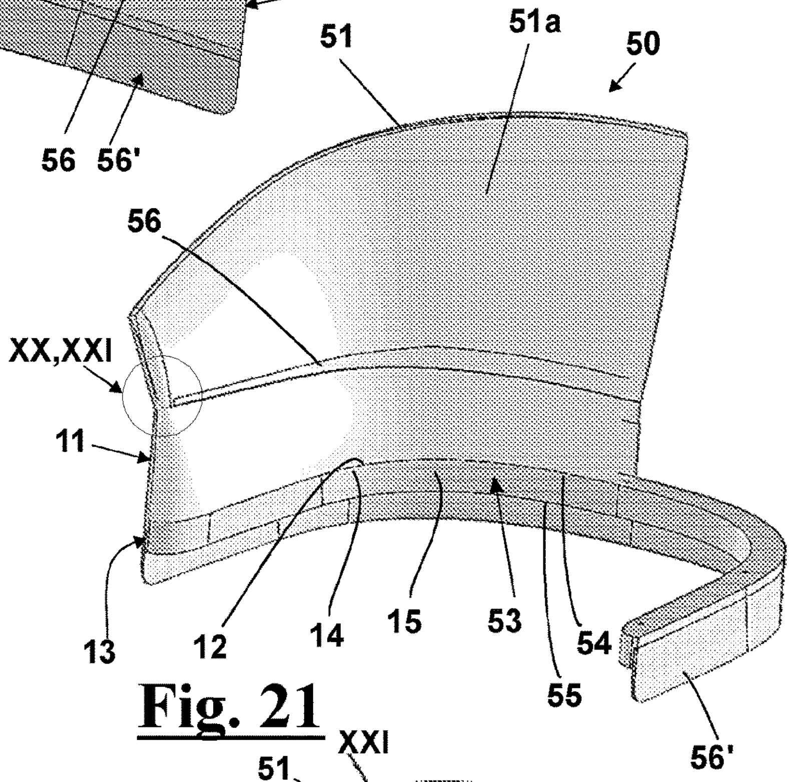
Fig. 19
Fig. 20
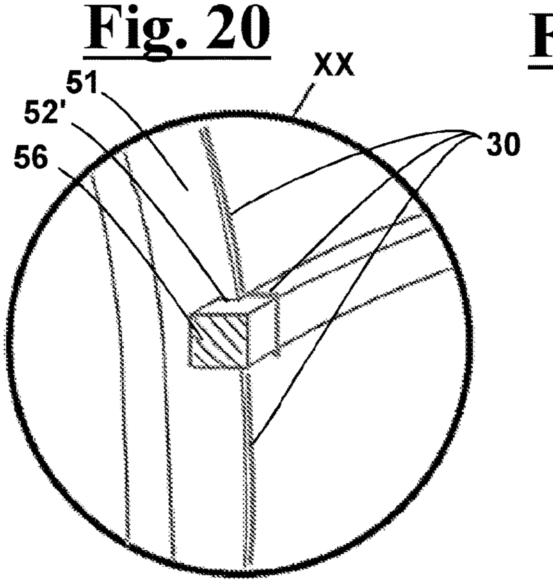
Fig. 21
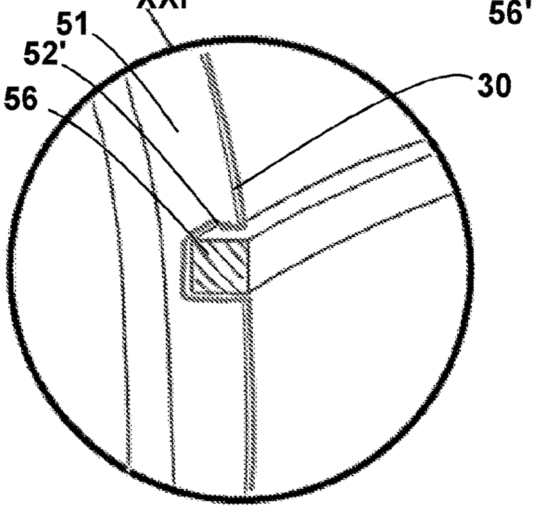

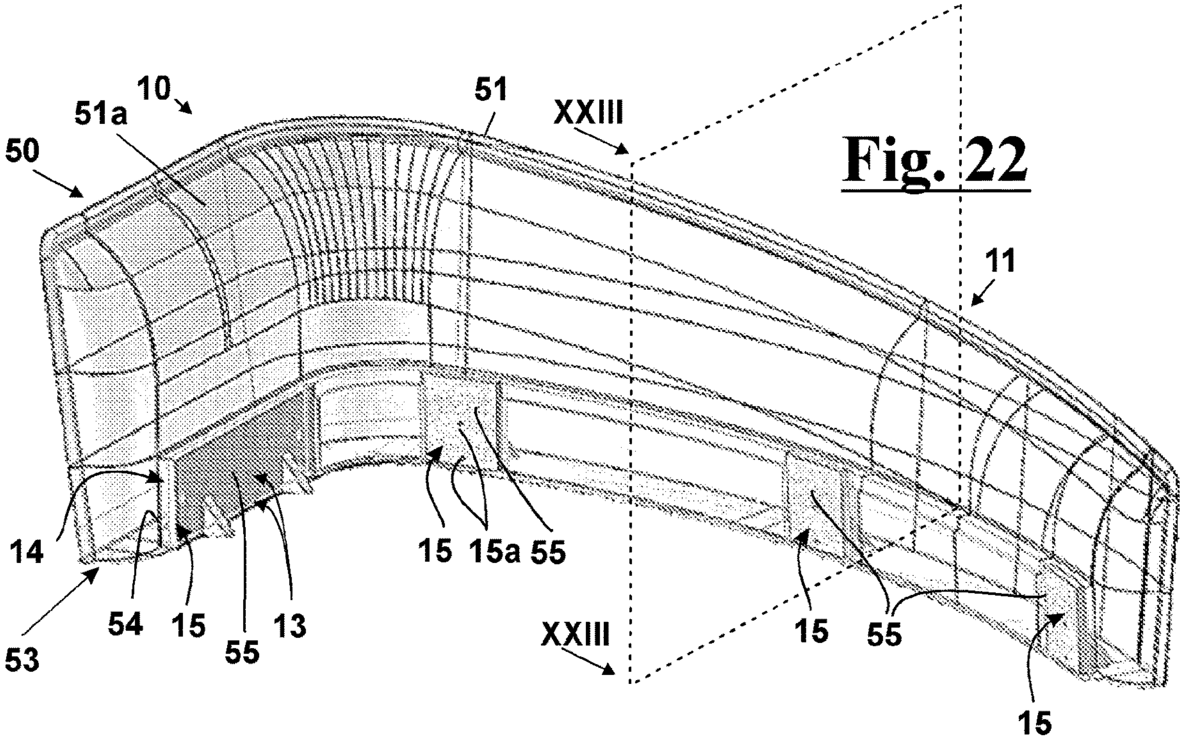
Fig. 22
Fig. 23
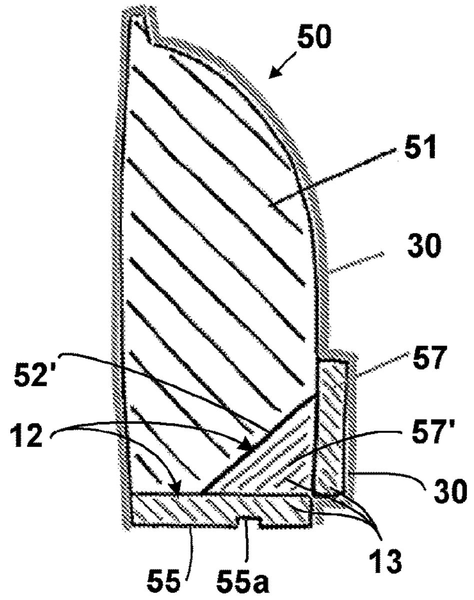
Fig. 24
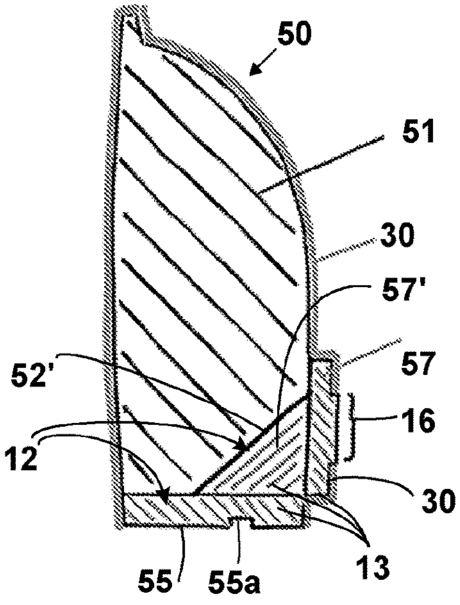

Fig. 28
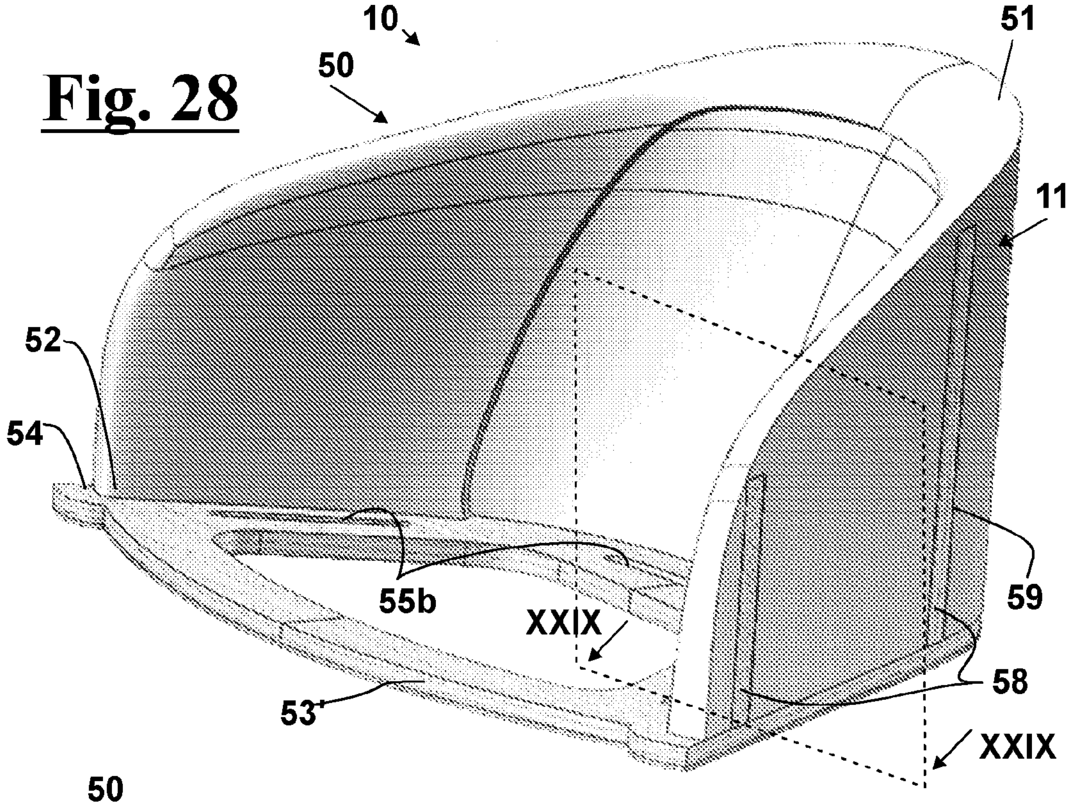
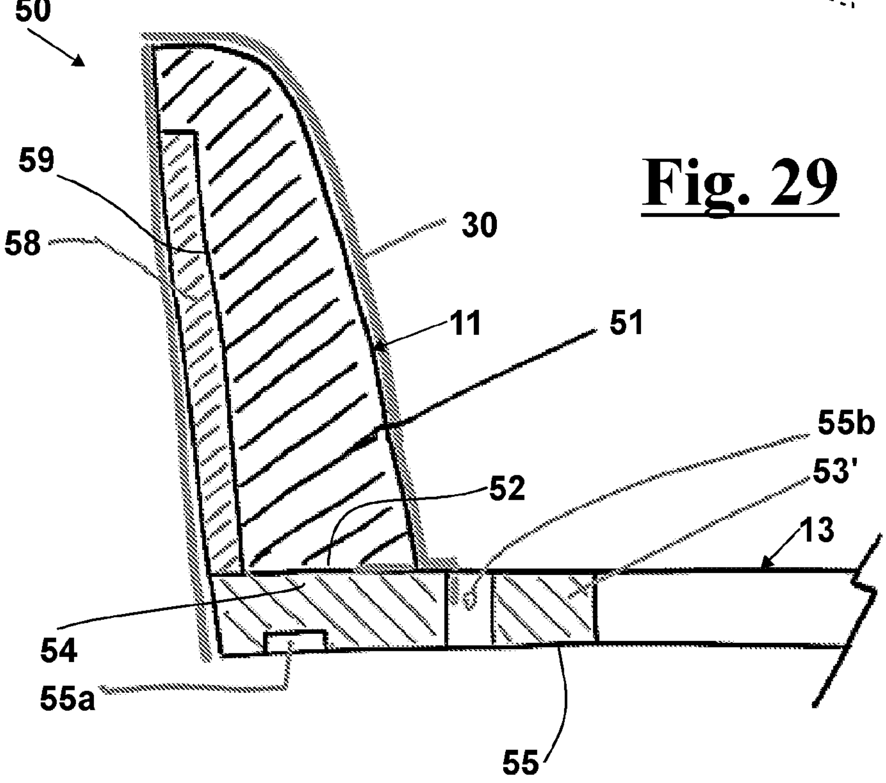
Fig. 29

Fig. 29A
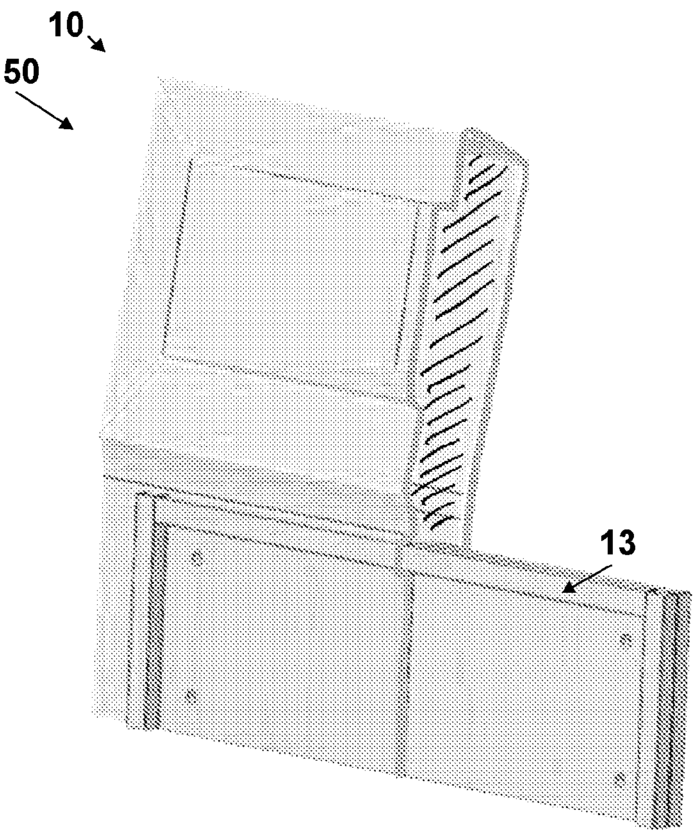
Fig. 29B
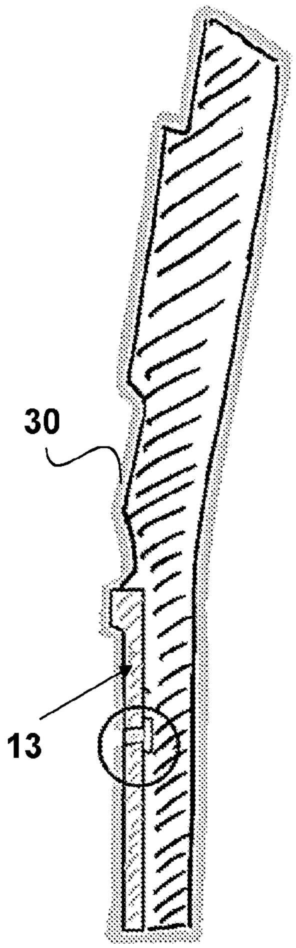
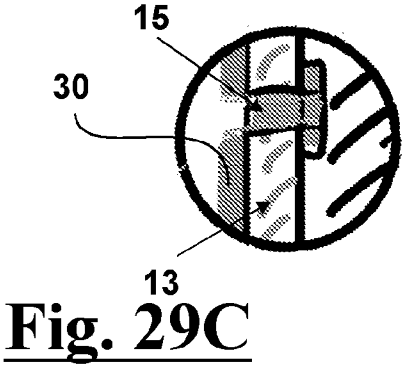
Fig. 29C

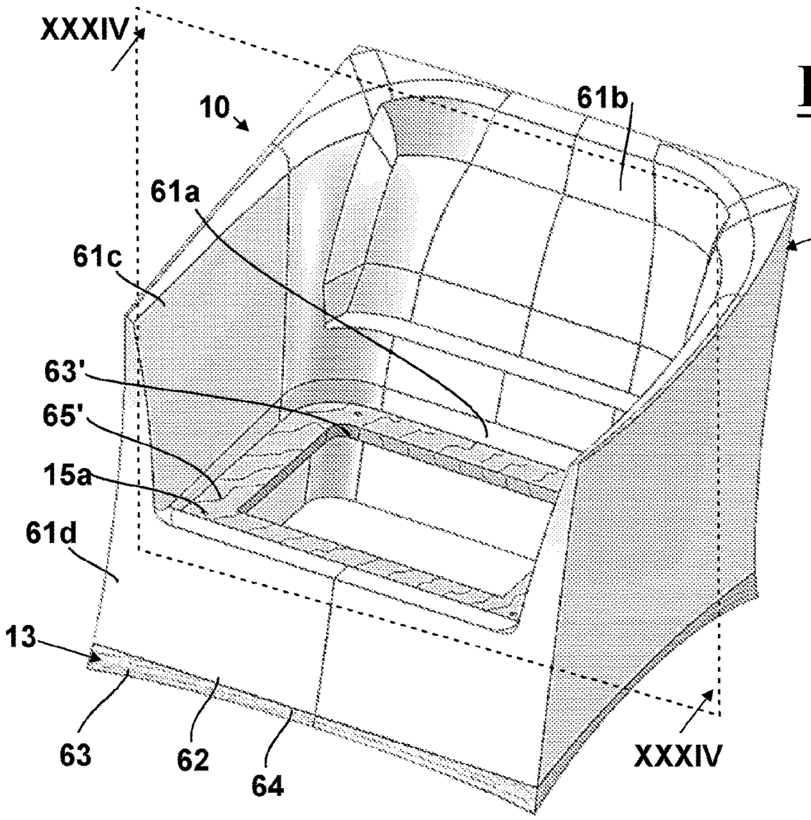
Fig. 33
Fig. 34
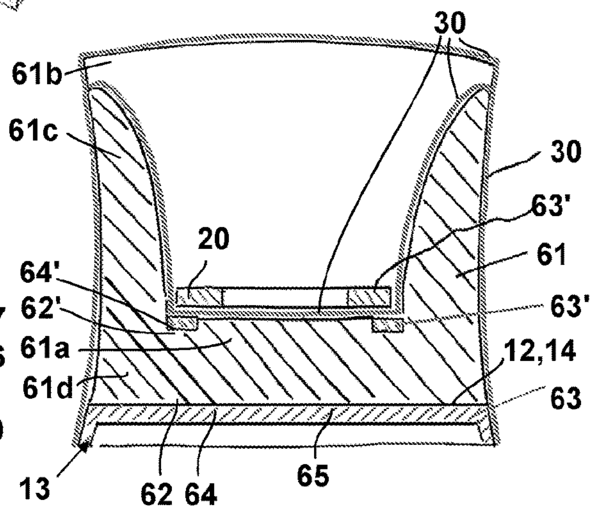
Fig. 35
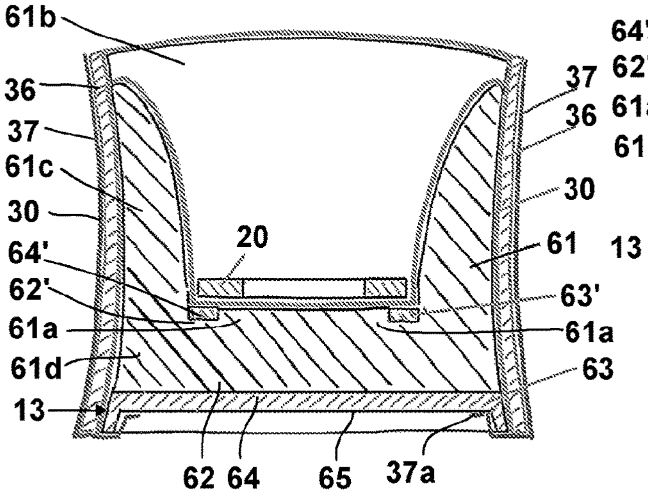

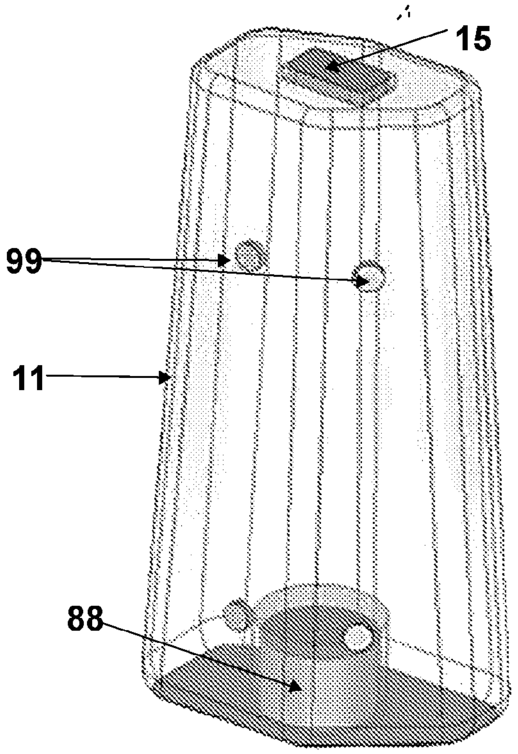
Fig. 43
Fig. 44
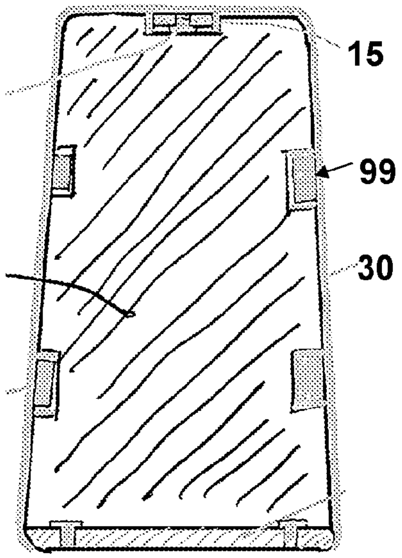
Fig. 45
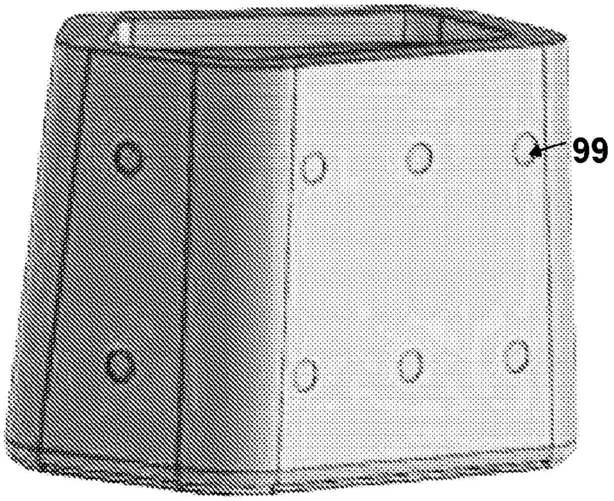

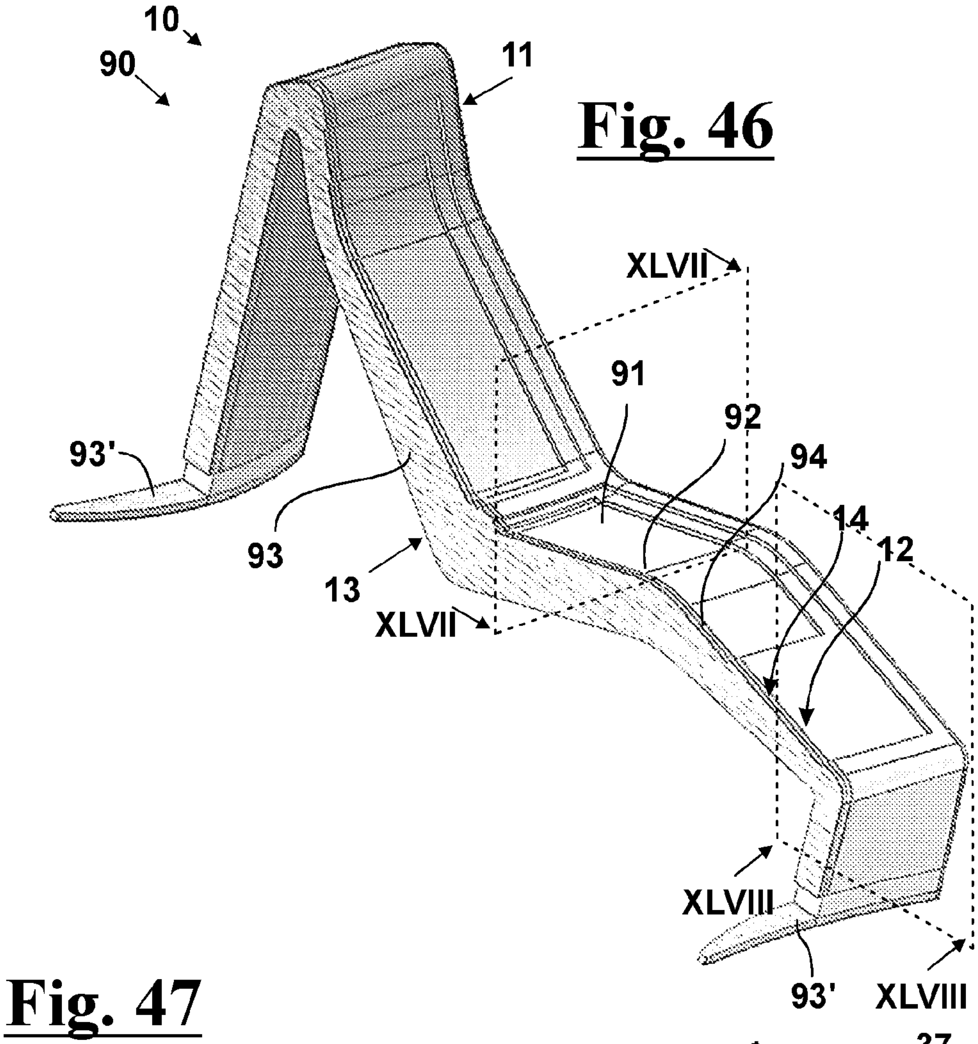
Fig. 46
Fig. 47
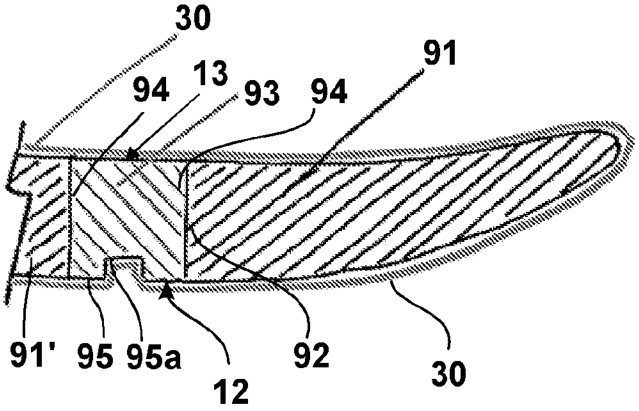
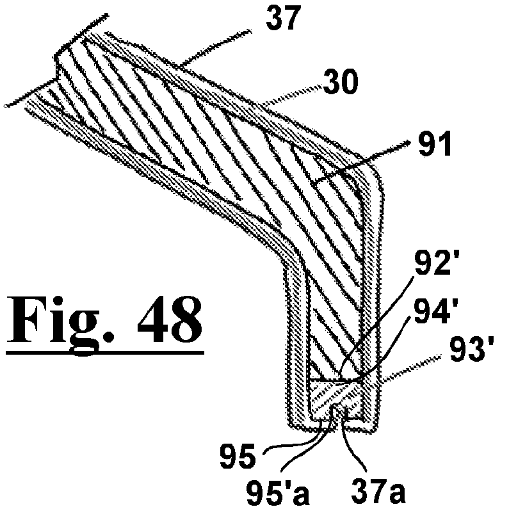
Fig. 48

METHOD FOR MANUFACTURING A PIECE OF FURNITURE

FIELD OF THE INVENTION

The present invention relates to a method for manufacturing furniture such as tables, chairs, beds, etc.

The invention also relates to furniture obtained with this method.

TECHNICAL PROBLEMS—PRIOR ART

A method is known, described in EP2346374, for the production of furniture such as sofas, beds, chairs, etc., starting from a block of expanded polystyrene material (EPS), which is cut and then milled on machine tools to obtain a blank of said material, having a desired shape and corresponding to that of the piece of furniture or a part of the piece of furniture to be made.

The blank, once made, is then coated on the surface by spraying with polymeric material, in particular a polyurethane resin, obtaining a furniture component having an EPS core and a rigid external cover of a few millimeters thick. The coated furniture component is very light and rigid, and replaces the wooden or metal frame of classic furniture components. The component is then upholstered in fabric, rubber or leather, or padded, possibly equipped with accessories, to obtain the final piece of furniture.

As described in EP2346374, the strength of the composite material of the furniture component is much higher than the basic strength of the uncoated blank, which is of plain expanded polystyrene. In fact, the hardening of the polymeric material creates a particularly hard and resistant shell that collaborates with the core formed by the blank. The addition of the upholstery and accessories to the component allows to obtain furniture of comparable strength with the existing wooden ones, even if of considerably reduced weight. In addition to the reduction of production costs and weights, the component thus created has a considerable advantage in the freedom of design by the creators of new and fancy shapes, which would be particularly complex to make of wood or metal.

The technology described above is particularly suitable for monolithic furniture, while it has limitations where furniture components, at least one of which is made in the manner described above, must be connected together. In fact, while wood and metal can be drilled to insert screws or connecting hardware, the components made with a coated polystyrene core, while being easily drilled, do not offer much resistance to screws and can bear with great difficulty connecting hardware for furniture.

There are known tables with the function of a school desk that include an EPS core sandwiched between two rigid panels, as described in CN201094456Y. Threaded bushings are provided to support the table legs by the rigid panels. A polyurethane foam strip is applied around the perimeter with a shockproof function for children.

SUMMARY OF THE INVENTION

In the following description, the term furniture means any piece of furniture for furnishing homes, offices, schools, boats, etc., while the term seat means any piece of furniture designed to be able to sit, such as a chair, armchair, sofa, stool, rocking chair, bench, deck chair, etc.

It is an object of the present invention to provide a method for the production of a piece of furniture such as a seat, a bed, a table, etc., which allows to produce furniture components, having a core of expanded polystyrene coated with polymeric material, that can be easily connected to each other.

It is another object of the present invention to provide a method for the production of a piece of furniture such as a seat, a bed, a table, which allows to make components with a core of expanded polystyrene coated with polymeric material, which can be connected to each other in a resistant and stable way.

These and other objects are achieved by a method for producing a piece of furniture such as a seat, a bed, a table, the piece of furniture comprising at least one furniture component, the method comprising the steps of:

- making a blank of expanded polystyrene (EPS) with a density between 15 and 25 kg/m$^3$, the blank being configured to act as a core for the furniture component;
- creating an interface surface in the blank;
- making an insert in rigid material having an engagement portion configured to engage with the interface surface of the blank and a connection portion opposite the engagement portion;
- joining the insert and the interface surface so that the engagement portion is engaged with the interface surface and the connection portion faces away from the blank;
- coating the blank and the insert of at least one coating layer in polyurethane material, so that the coating layer entirely covers the blank and the insert, with the exception of at least a part of the connection portion.

In this way, the step of coating the blank and the insert of at least one coating layer in polyurethane material, making sure that the coating layer in polyurethane resin covers both the blank and the insert, creating a rigid "bridge" shell that connects them solidly along a junction line between them, allowing the insert to be solidly and stably joined to the blank. The connection portion, while engaging with the expanded polystyrene blank, allows an extremely safe anchorage for other furniture components, and is able to receive loads distributed by the furniture component, for example the weight of a person sitting on a seat or laying on a bed, or the weight of an object on a table, as well as concentrated loads, such as a binding reaction of a table foot or an armchair leg that transmits a load to the floor, or the concentrated load of a staple or of a riveting of upholstery or other upholstery elements in leather or fabric.

The insert, made of wood or other rigid material, can be a simple board, or it can be a reinforcing rib, a frame, or even a combination of several insert portions. The insert can be made by milling from a blank a corresponding shape of the interface surface, so as to copy the shape of the interface surface, and so that it can be solidarized to it, preferably by gluing it up to stably joining the interface surface and the engagement portion over the entire contact region between them.

The connection portion that the insert provides can be a simple surface for applying an external connecting element, such as a self-tapping screw, a nail, a staple. Alternatively, the connection portion may comprise a furniture hardware, such as a nut, a bush, a stud, a barrel joint, an eccentric joint, etc.

In particular, the connection portion can be a threaded bushing, like an eccentric connector also called "spider", which is inserted from the side of the engagement portion before the insert is fixed, for example by gluing, to the interface surface, and then a nut screw emerges from the side of the connection portion, via a through hole made in the insert between the engagement portion and the connection portion.

To allow easy access to the connection portion, the polyurethane coating resin layer can be removed, or preferably not applied. In this case, it is sufficient to cover the connection portion at the time of application of the polyurethane coating resin layer, so that the latter, preferably applied by spraying or spreading, does not cover the connection portion or penetrate it.

The covering of the connection portion to prevent it from being covered with the polyurethane material can be done manually, for example with a portion of tape or a removable cap or mask. In the case of robotic spraying, the covering of the connection portion can be done automatically, with masks positioned by the spraying robot itself or by a robot cooperating concurrently with the spraying.

In a further possible embodiment, the furniture component is a first furniture component, and a second furniture component is provided, the further steps being provided of: making the second furniture component, so that the second furniture component comprises a second insert made of rigid material, the second insert having a second connection portion configured to be connected with the connection portion of the first furniture component. Then, the solid connection of the first furniture component and the second furniture component is achieved by integrally joining the insert of the first furniture component and the second insert through the connection portion of the first furniture component and the second connection portion.

In a further possible embodiment, the blank is a first blank, the method further comprising the steps of: making a second blank of expanded polystyrene with a density between 15 and 25 kg I me, the second blank being configured to act as a core for the second furniture component; realization in the second blank of a second interface surface; making the second insert of rigid material having an engagement portion configured to engage with the second interface surface and a connection portion opposite the engagement portion; insertion of the insert into the second interface surface so that the engagement portion is engaged with the second interface surface and the connection portion faces away from the second blank; coating the second blank and on the second insert by at least one coating layer of polyurethane material, so that the coating layer entirely covers the blank and the second insert with the exception of at least one part of the second connection portion.

In a possible embodiment of the method, the furniture component is a seat. In this case, the blank is a seat-shaped EPS blank comprising a backrest portion and a seat portion. In this case, the interface surface is made by making a recess or a coupling surface in the seating portion. The insert can have the form of a board element and a portion of its edge embodies the engagement portion of the insert, while the connection portion is embodied by the lower face of the table, to which a second furniture component, which can comprise a support of the seat to the floor, in particular, a frame having legs or a base, can be fixed, by means of furniture hardware. Therefore, the coating layer of polyurethane material completely covers the blank at the seat and the board, thus reinforcing the solidarity between them, with the exception of connection portions of the lower face of the insert.

In particular embodiments, the engagement portion is selected among: the whole edge of the board; one part of the edge of the board, while the other part of the edge forms a free edge of the seat.

In another possible embodiment, in which the furniture component is a backrest of a seat, the EPS blank has the shape of a backrest, without a seat. In this case, the interface surface is formed by a lower edge of the backrest blank, the insert is an arched element having a shape that copies the lower edge, and the engagement portion is the upper edge of the element arc, while the connection portion is embodied by the lower face of the arched element. To the latter, therefore, a second furniture component can be fixed, again by means of furniture hardware, which can comprise an intermediate board to which legs can then be fixed or a base can be fixed for supporting the seat to the floor, or directly a frame having legs, or a base can be fixed.

The coating layer of polyurethane material entirely covers the backrest blank and the arched element, creating a rigid bridge along their joint area, and reinforcing the solidarity between them, with the exception of portions of the lower face which serve as connection.

In addition to the arched element, in a particular embodiment, at least one arched reinforcement can be provided that extends in a groove made in the backrest, internally or externally to the user back support area. The coating layer of polyurethane material completely covers the arched reinforcement, or the coating layer of polyurethane material covers the groove and acts as an adhesive between the arched reinforcement and the groove. This arched reinforcement, for example made of hardboard or other rigid or otherwise strong material and able to withstand concentrated loads, has the main function of acting as a tapping or anchoring area for upholstery for furniture or other aesthetic elements, made of leather or fabric.

In a possible embodiment, an arched bandage applied externally to the arched element is provided; in particular, reinforcing boards are provided substantially orthogonal to the arched element, possibly provided with bracing that engage with recesses made in the backrest blank.

In these embodiments, the arched shape is purely exemplary, and could also be a polygonal shape, or other curved-line or broken-line geometric shape, responsive to the structure of the furniture component.

In another possible embodiment, the furniture component is a backrest of a seat, the blank is an EPS blank with a backrest shape and the interface surface is formed by a lower edge of the backrest blank. However, the insert is not an arched element but a frame, having a perimeter portion that copies the lower edge, and the engagement portion is the perimeter portion of the frame. In this case, the polyurethane resin layer may not cover the entire insert, but may only partially cover the frame, both on the outer edge and adjacent to the perimeter portion, to create in these areas a rigid and tenacious connection bridge in the vicinity of the junction area between the board and the backrest blank. Alternatively, the coating layer of polyurethane material entirely covers the backrest blank and the frame, reinforcing the solidarity between them, with the exception of the connection portion. A connection portion can be embodied by the lower face of the frame, to which a second furniture component, which can comprise legs or a base for supporting the seat to the floor, can be fixed, by means of furniture hardware. The upper face of the frame can also be used to fasten furniture components, for example by means of strapping.

In a possible particular embodiment, ribs can be fixed to the frame which extend in grooves made in the backrest and which are also covered by the layer of polyurethane resin.

Such ribs, made of wood or hardboard, can be used as additional connection portions for tapping upholstery or other leather or fabric lining.

In yet another possible embodiment, the furniture component is a seat with a base and the blank is an EPS blank with a seat-like shape with an integrated base, for example a monolithic seat formed by a backrest portion, a seat portion, any armrest portions, and a base portion. The entire blank can be made by single milling from EPS block or preformed blank. As an alternative to the monolithic solution, the blank can also be made of several semi-finished EPS components glued together.

In this embodiment, the interface surface is the lower face of the base portion, and the insert is a base reinforcement, or base board which has the engagement portion corresponding to an upper face of its own configured to mate with the lower face of the base portion. In this case, the polyurethane resin layer that covers the semi-finished seat with base also may cover part or all of the base reinforcement, or entirely covers only the side faces of the base reinforcement, or even a part of the lower face.

In a possible embodiment, the seat-shaped blank with base comprises a seat portion, and the interface surface is made by making a recess in the seat portion, and a further insert is provided in the form of a frame element and a portion of its edge embodies the engagement portion of the insert.

In a possible embodiment, the frame element, entirely coated with polyurethane resin with the exception of connection portions, on the upper face, allows the anchoring of a second furniture component, in the form of a strapping board, anchored to the frame insert by means of furniture hardware.

Also in this embodiment, the seat blank with base can have the seat portion entirely made of EPS, i.e. the semi-finished monolithic block, or made of several semi-finished EPS components glued together.

In another possible embodiment, the furniture component is a table, or tea table, and the blank is a table-shaped EPS blank table top and legs, in particular, an inverted U-shaped table-like blank. The interface surface is formed by a lower edge of the legs and the insert is a shaped bar configured to copy the lower edge of each leg. The engagement portion is an upper face of the bar, and the polyurethane resin layer covers the bar at least partially adjacent to the lower edge, to create in these areas a rigid and tenacious connection bridge in the vicinity of the joint area between them.

In this embodiment, the connection portion is embodied by the lower face of the bar, to which a second furniture component can be fixed, by means of furniture hardware, for example a table foot having an aesthetic function, or a base element.

In a particular embodiment of the table or small table, a further interface surface is provided, made by making a recess in the table top in which a table top board element engages along its edge, and wherein the polyurethane resin layer covers the table-shaped blank and also partially or totally covers the board element. This table top board has the function of conferring a desired flatness to the table, compensating for any deformations due to shrinkage induced by the polyurethane resin.

In a possible embodiment in which the furniture component is a table, the blank can be a monolithic table in EPS, comprising both a table top and a central base. Even in this case, the entire blank can be made from a single milling from EPS block or preformed blank, or it can be made from multiple semifinished EPS components glued together.

In this case, the interface surface can be a perimeter recess in the base and the insert is a base board with a central hole, and at least the upper edge of the base board embodies the engagement portion. The connection portion is the lower face of the base board to which a second furniture component can be fixed as a ballast, for example of metal, engaged in a further recess in the base and placed above a support board, which is connected to the base board by means of furniture hardware, previously inserted in the latter before coupling with the interface surface and the application of the polyurethane coating resin layer.

In a particular embodiment, a second connection portion can be made on the lower face of the support board, by means of furniture hardware, where support foot elements can be fixed.

In possible embodiments of the table, an upper interface surface in the table top can be made, and an upper reinforcing element selected from a stretcher made of rigid material or a board can be provided.

In this case, the application of an upper board on the upper reinforcing element and the application of a second layer of resin between the table top and the upper board can be provided.

Alternatively, or in addition, the application of a resin layer on the upper interface surface can be provided before applying the upper reinforcing element.

As a further possibility, the application can be provided of an upper board on the upper reinforcing element and the application of a polyurethane coating resin layer which covers the upper board and also all the monolithic table blank and insert. The upper board, in particular, can be perforated to allow the coating layer of polyurethane resin to penetrate it.

In a further possible embodiment, the furniture component is a chaise longue portion, the blank is a shaped monolithic blank and the interface surface is made on a lateral face of the shaped monolithic blank.

The insert can be a rigid profile also shaped so as to copy the shaped portion and so as to couple with the side face. Therefore, the engagement portion is embodied by the lateral edge of the rigid profile, while the connection portion is embodied both by the connecting face of the rigid profile opposite the lateral edge and by at least one of the free faces of the rigid profile.

This connection portion has a double function. The first is to connect a second furniture component formed by an identical shaped monolithic blank which shares the rigid profile. In this case, the polyurethane coating layer integrates the first and the second furniture component with the rigid profile. The second is that on at least one of the free faces of the rigid profile there are connection portions for other components and for fixing upholstery or other leather or fabric coverings.

In a particular embodiment of the chaise longue, the shaped monolithic blank can have opposite lower ends which each have a further insert, the edge of which embodies the engagement portion with the interface surfaces, embodied by the ends of the blank. In this case, the polyurethane coating layer integrates the insert with the ends.

BRIEF DESCRIPTION OF THE DRAWINGS

The invention will be illustrated below with the description of its embodiments, given by way of non-limiting example, with reference to the attached drawings in which:

FIGS. 10 and 11 show a component of another exemplary seat, in particular, a sofa, made with the method according to the invention and depict respectively a partial perspective view and a cross sectional view along XI-XI of FIG. 10 after application of the coating resin layer;

FIGS. 14 and 15 show a component of another exemplary seat, in particular, a backrest, made with the method according to the invention and depict respectively a partial perspective view and a cross sectional view along XV-XV of FIG. 14 after application of the coating resin layer, while FIG. 16 shows the application of a covering to the seat in the same partial sectional view of FIG. 15, and FIG. 17 is a detail corresponding to the enlargement area XVII of FIG. 16;

FIGS. 18 and 19 show a component of another exemplary seat, in particular a backrest, made with the method according to the invention and depict respectively a partial perspective view from the front and from the back, while FIG. 20 is a detail corresponding to the magnification zone XX of FIG. 19, and FIG. 21 shows a variant of application of a coating in the same partial sectional view of FIG. 20;

FIGS. 22 and 23 show a component of another exemplary seat or bed, in particular, a backrest or headboard, made with the method according to the invention and depict respectively a perspective view and a cross sectional view along XXI II-XXII I of FIG. 22, while FIG. 24 shows a variant of the resin coating in the same partial cross-sectional view of FIG. 23;

FIGS. 25 and 26 show a component of another exemplary seat, in particular usable to make an armchair, made with the method according to the invention, and depict respectively a partial perspective view and a cross sectional view along XXVI-XXVI of FIG. 25, while

FIGS. 28 and 29 show a component of another exemplary seat, in particular usable to make an armchair, made with the method according to the invention and depict respectively a partial perspective view and a cross sectional view along XXIX-XXIX of FIG. 28;

FIGS. 29A, 29B, 29C show seat variants according to the invention; FIGS. 30 and 31 show a component of another exemplary seat, in particular usable to make an armchair, made with the method according to the invention and depict respectively a partial perspective view and a sectional view along XXXI-XXXI of FIG. 30, while

FIGS. 33 and 34 show a component of another exemplary seat, in particular usable to make an armchair, made with the method according to the invention and depict respectively a partial perspective view and a sectional view along XXXIV-XXXIV of FIG. 33, while FIG. 35 shows the application of an upholstery to the seat in the same partial cross-sectional view of FIG. 34;

FIGS. 40 and 41 show another example table made with the method according to the invention and depict respectively a perspective view from above and a sectional view along XLI-XLI of FIG. 41, while

FIGS. 43-46 show a variant of a table leg made with the method according to the invention FIGS. 46 and 47-48 show a component of an exemplary seat, in particular usable to make a chaise longue, made with the method according to the invention and depict respectively a partial perspective view and two sectional views along XLVII-XLVII and XLVI II-XLVIII of FIG. 46.

DESCRIPTION OF PREFERRED EMBODIMENTS

Figure 1:
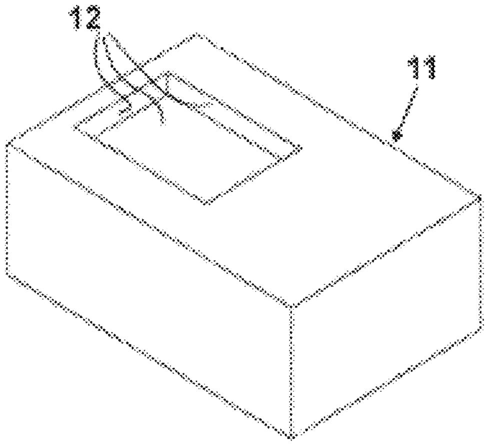
FIGS. 1 to 7 are a schematic view of successive steps of the method for making a piece of furniture according to the invention.

With reference to FIGS. 1 to 6, a method for the production of a piece of furniture such as a seat, a bed, a table can provide making a furniture component 10 (FIG. 6) which forms a frame of the piece of furniture or a part of it. Component 10 can be obtained starting from a blank 11 (FIG. 1) of expanded polystyrene with a density between 15 and 25 kg I me and configured as a structural core thereof.

As described in EP2346374, the description of which is to be considered incorporated by reference, the blank 11 can be obtained by milling or cutting from a block or from a molded blank, with a mechanical processing which can also be done in a robotic manner.

The blank 11, for simplicity of presentation, is schematically shown in FIGS. 1-6 as a parallelepiped, but it can have any furniture shape, such as for example a seat, a backrest, an armchair, a chair, a table, a headboard of a bed, etc., as described in an exemplary and non-limiting manner below in the present description for some of the possible embodiments.

According to the invention, in the blank 11, an interface surface 12 is made (FIG. 1), for example during cutting or milling for making the blank itself, for example by means of a same milling robot or another machine tool that cuts the blank 11. Alternatively, the interface surface 12 is made with subsequent processing, placing the blank 11 on a machine tool other than the one that made it, or with manual processing.

The interface surface 12 can be a recess or a protuberance, or it can also be a reference surface such as a flattening to achieve a desired shape. For example, and for simplicity of presentation, the interface surface 12 is shown as a rectangular recess in FIG. 1.

Still according to the invention, an insert 13 is made of rigid material such as wood, hard plastic, metal, laminate such as HPL. The rigid insert 13, as shown in FIGS. 2 and 3, has an engagement portion 14 configured to engage with the interface surface 12 of the blank 11 and a connection portion 15 opposite the engagement portion 14.

The connection portion 15 can be a simple surface for applying an external connecting element, such as a self-tapping screw, a nail, a tapping. Or it may comprise a fastener 15*a* for furniture, such as a nut bush, a stud, a barrel joint, an eccentric, etc.

Figure 2:
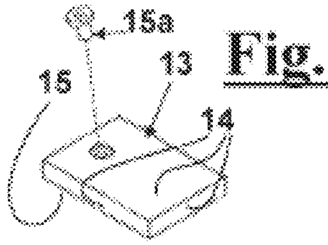
Figure 3:
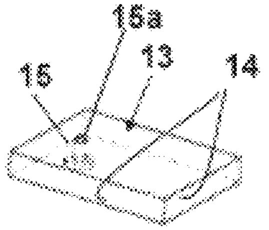

FIGS. 2 and 3 show by way of example a threaded bush 15*a*, such as of the so called "spider" type, which is inserted from the side of the engagement portion 14, and then causes the nut screw 15*a* to emerge from the side of the connection portion 15.

Figure 4:
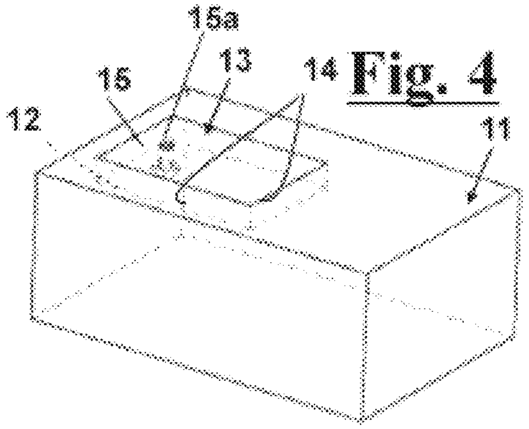

As shown in FIG. 4, the engagement portion 14 can be configured to mate with the interface surface 12, with which it is engaged in such a way as to allow a solidarization between the rigid insert 13 and the interface surface 12, and so that, when the engagement portion 14 is engaged with the interface surface 12, the first connection portion 15 faces away from the blank.

The solidarization can be carried out in any known way, for example by means of glues or adhesives, for example specific adhesives of the known type for wood/polystyrene, hard plastic/polystyrene, metal/polystyrene, foils/polystyrene, etc.

Figure 5:
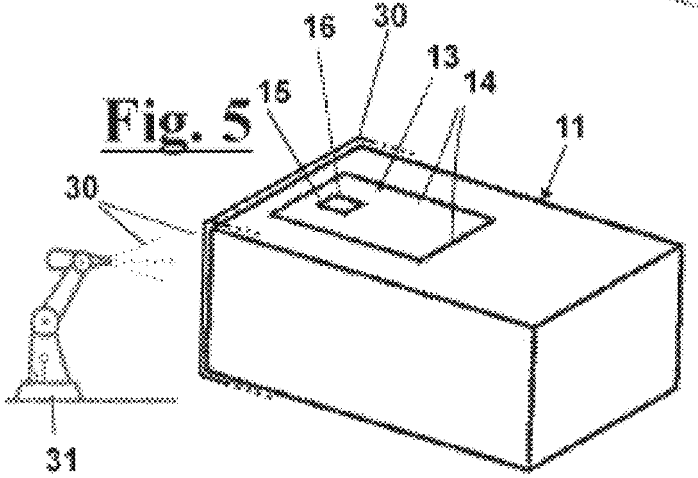

This first solidarization is followed, according to the invention, by a second solidarization, shown schematically in FIG. 5, which can provide the application both on the blank 11 and on the rigid insert 13 of at least one coating layer 30 of polyurethane material a few mm thick, so that the coating layer 30 completely covers the blank 11 and the rigid insert 13.

This coating can be done by spraying, manually or for example with a robot 31 symbolically indicated with an icon in FIG. 5, so that the shell made of polyurethane material covers the blank 11, but in particular covers the surface region where the interface surface 12 of the blank 11 and the engagement portion 14 of the rigid insert 13 can be in contact with each other. This makes it possible (FIG. 6) to create a connection hard shell bridge 101 in the joint area which, after solidification of the polyurethane material, takes on a hard and glassy consistency and forms a single body between the blank 11 and the coating layer 30.

The covering is made with the exception of at least an exception portion 102 (FIG. 5 and FIG. 6) of the connection portion 15. In this way, the coating layer 30 coats the connection portion 15 all around the exception portion 102 creating a hard shell which integrally connects blank 11 said rigid insert 13 along a joint line therebetween, allowing the rigid insert 13 to be solidly and stably attached to the hard shell bridge 101 and allowing said exception portion 102 at the same time to be free from the interface surface and surrounded by said hard shell bridge 101. Moreover, the polyurethane material 30, for example sprayed or spread, does not "invade" the connection portion 15, in particular if it includes a hardware element 15*a* which must obviously remain free to make the connection.

The covering of the connection portion 15 to prevent it from being coated with the polyurethane material can be done manually, for example with a portion of strip 16 or a removable cap or capsule (FIG. 5). In the case of robotic spraying 31, the covering of the connection portion can also be done automatically, in a manner not shown, with masks positioned by the spraying robot itself or by a robot cooperating in conjunction with the spraying.

The sum of the above first and second solidarizations thus forms the furniture component 10 (FIG. 6) and makes the rigid insert 13 and the blank 11 a single body, with the characteristic that the rigid insert 13, made of rigid material, can withstand concentrated loads. The covering 30 therefore serves to make the connection between the insert and the blank extremely robust in order to transmit all concentrated loads to the latter in a robust manner. The rigid insert 13, made of wood or other rigid material, can be a simple board, or it can be a rib, a frame, or even a combination of several portions of the insert.

The connection portion 15 can be used to attach a leg or base of a seat or a table, or to connect two components both made with the method according to the invention, as well as to fix the component of mobile to a support, or for resting the furniture on a floor or other support surface, etc.

Figure 7:
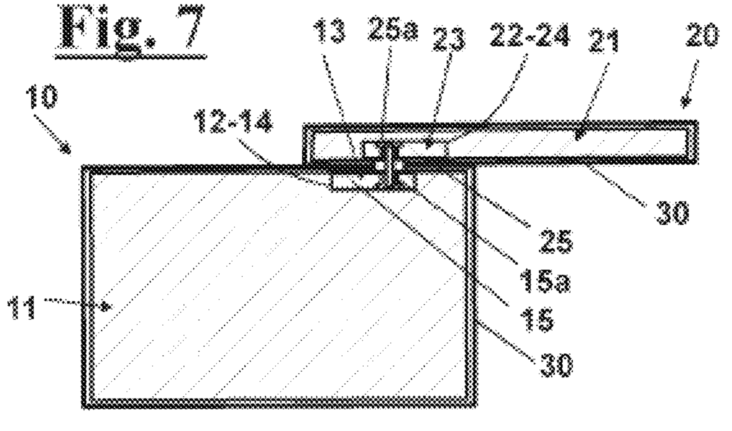

As shown schematically in FIG. 7, the first furniture component 10 and a second furniture component 20 can be joined together. The second piece of furniture 20 can comprise a second insert 23 made of rigid material having a second connection portion 25 configured to be integrally connected with the connection portion 15 of the first component 10.

The second furniture component 20 can also be made starting from a second blank 21 of expanded polystyrene with a density between 15 and 25 kg/m$^3$, which acts as a core for the second furniture component 20, and has a second interface surface 22, with which a second insert 23 made of rigid material can engage, having a second engagement portion 24 configured to engage with the second interface surface 22 and a second connection portion 25 opposite to the second engagement portion 24.

Also the blank 21 and the second insert 23 are then covered with at least one layer of coating layer 30 of polyurethane material, so that the coating layer 30 completely covers the blank 21 and the second insert 23 except of at least a part of the second connection portion 25. The two components 10 and 20, then, can be joined together through the inserts 15 and 25 respectively solidarized to them by means of the layer of polyurethane resin 30.

In the following description of specific embodiments of the method, specific examples of furniture such as chairs or tables are depicted and described, being it clear that such examples are purely exemplary ones.

Figure 8:
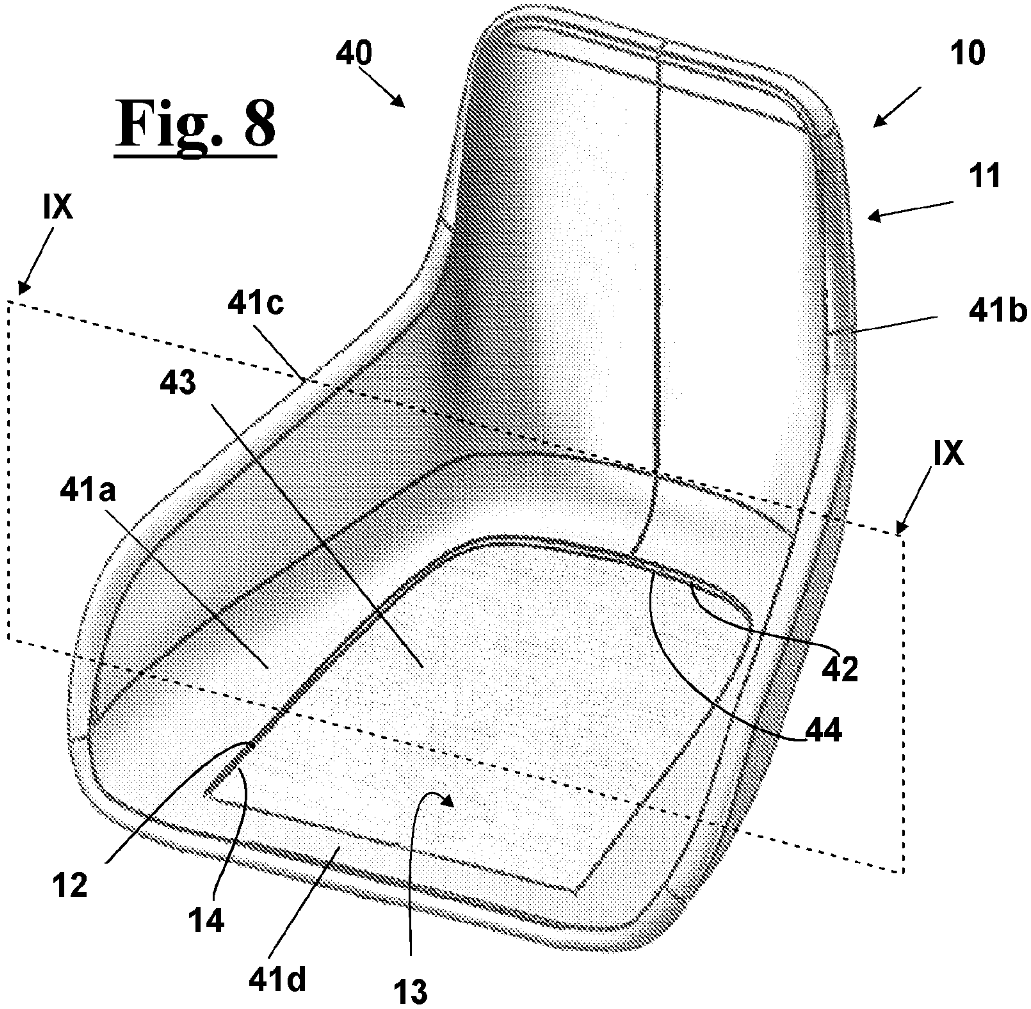
FIGS. 8 and 9 show a component of an exemplary seat, made with the method according to the invention and depict respectively a partial perspective view and a cross sectional view along IX-IX of FIG. 8 after application of a coating resin layer.
Figure 9:
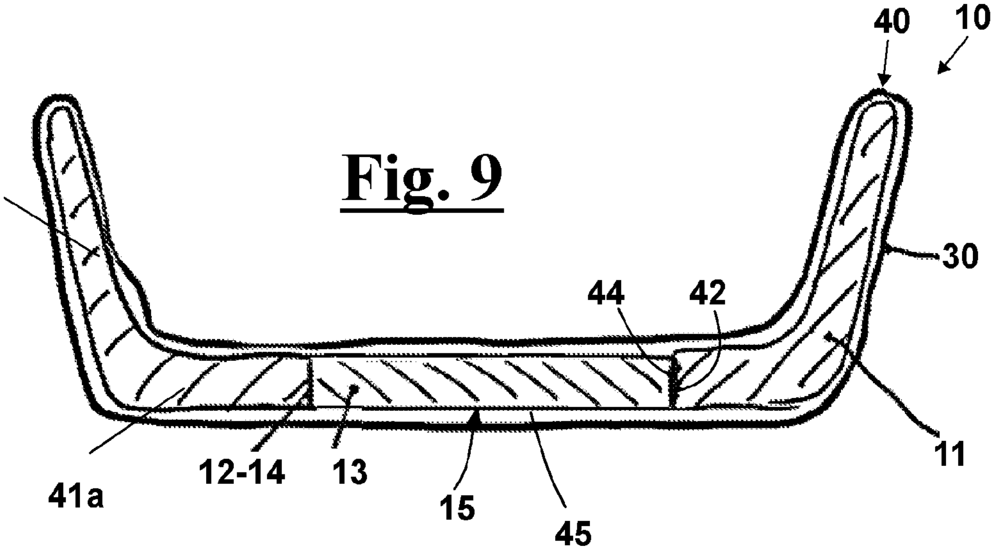

With reference to FIGS. 8 and 9, the piece of furniture can be a seat 40 formed by a seat blank 41 comprising a seat portion 41 *a* and a backrest portion 41 *b* with armrests 41 *c*. The interface surface 12 can be made by making a recess 42 in the seat portion 41 *a*. In FIG. 8, the recess 42 has a substantially rectangular shape with some joined edges. Obviously, it can also have other shapes, linked to the structure and design of the seat.

The rigid insert 13 can be a board element 43 of a shape corresponding to the recess 42, and a portion of its outline 44 embodies the engagement portion 14 of the rigid insert 13, while the connection portion 15 can be formed by the lower central part 45 of the board element 43 under the seat, to which a second furniture component can be fixed, not shown for simplicity. This second furniture component can be a frame having legs or forming a base, and can be fixed, by means of furniture hardware not shown, to the lower central part 45, which acts as a connection portion 15 with principles similar to that shown in FIG. 7.

In particular, in FIG. 8 the seat-shaped blank 41 shows an assembly of the seat 40 of an armchair before the spraying of the polyurethane resin layer 30 shown instead in FIG. 9. The processing steps to obtain the blank 41 comprise milling an EPS blank, not shown, including the recess 42 which forms the interface surface 12 for making the coupling between the EPS blank and the rigid material, preferably wood or other structural material, of the board 43. The latter can be cut in a pantograph, copying the interface surface 12 formed by the edge 42, to form the contour 44 which embodies the engagement portion 14. In a way not shown, in the board element 43 there can be made holes and I or grooves for a possible housing of metal inserts such as screws, spiders, plates, and also grooves can be made to pin therein an external covering fabric.

The contour 44 of the board element 43 can be glued with glue or other adhesives to the EPS of the edge 42, or simply forced therein. Subsequently, after having protected any threaded and connecting elements with the base, in a way not shown, it is completely covered together with the blank 41, forming the polyurethane resin layer 30 uniformly arranged to cover the blank and the any EPS I wood I metal connection areas. In this way, the board element 43, well integrated with the seated blank 41, allows the concentrated loads to be directly transferred to an underlying base.

This description of the manufacturing steps of the blank 41 and of the polyurethane resin layer 30 which also covers the insert 43, can be applied by a person skilled in the art to any piece of furniture made according to the invention, object of the present description or in any case made according to the present invention.

With reference to FIGS. 10 and 11, similarly to FIGS. 8 and 9, the furniture component can be a sofa seat 40' formed by a semi-finished seat with a corresponding shape 41 comprising a seat portion 41 *a*, which can be made by making an elongated recess 42 for its entire width suitable for receiving the rigid insert 13 of a corresponding shape and formed by the elongated board element 43. For this embodiment, the description above, relating to the figures constitutes 8 and 9, is applicable with the same reference numbers.

In the embodiments of FIGS. 8-11, the engagement portion 14 can be formed by the entire edge 44 of the board element 43, and the interface surface 12 can be the edge of the recess 42, delimited at the front by the free edge 41 *d* of the seat 41 *a*.

Figure 13:
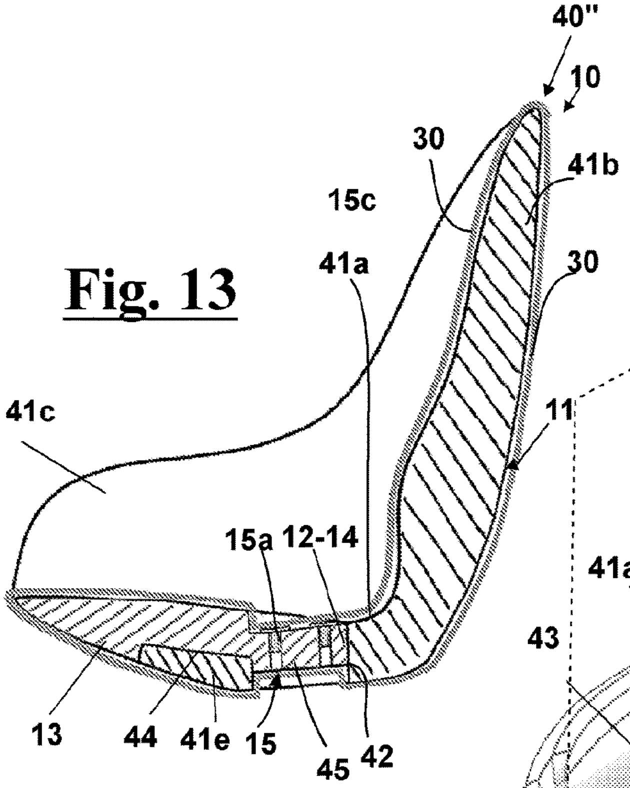
FIGS. 12 and 13 show a component of another exemplary seat realized with the method according to the invention and depict respectively a partial perspective view and a cross sectional view along XIII-XIII of FIG. 12 after application of the coating resin layer.
Figure 12:
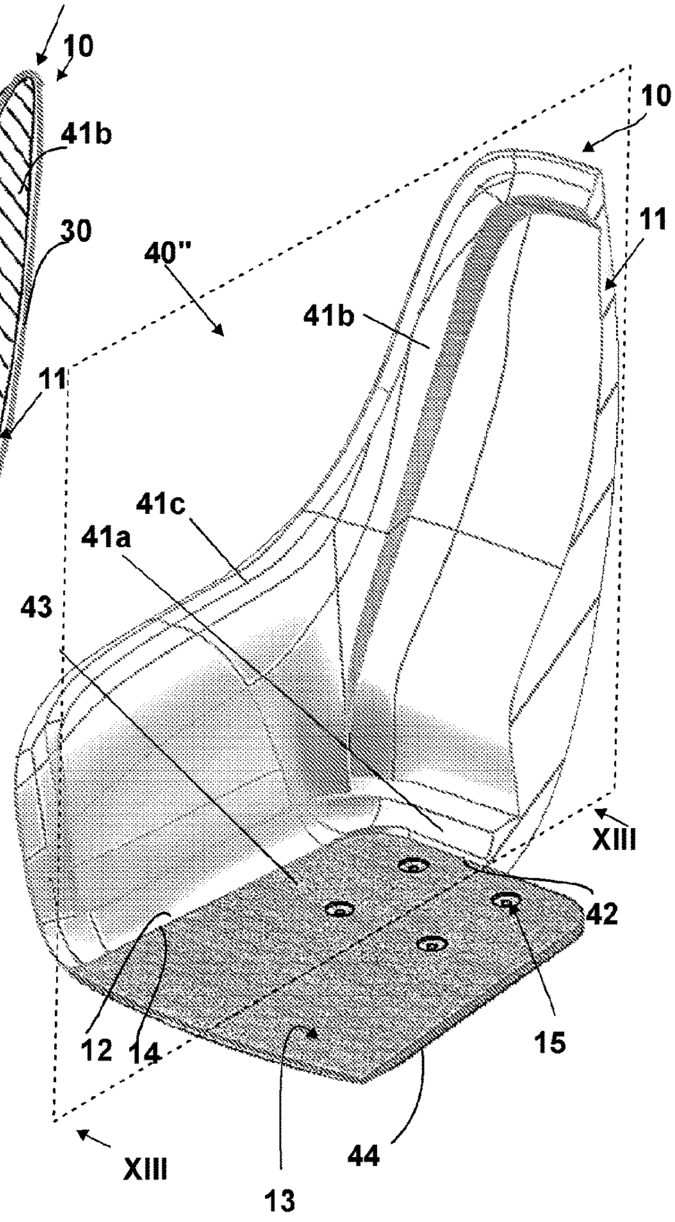

In an alternative embodiment of a seat 40", shown in FIGS. 12-13, analogous to the embodiments of FIGS. 8-11, the free edge 41 *d* of the seat 41 *a* of the latter can be absent, and the recess 42 can be open at the front, so that the free edge of the board 43 is also the front edge of the seat 40.

To allow a stable support of the board element 43, the seat 41 *a* can have a lower support crosspiece 41 *e*, also made of pieces starting from the EPS blank to obtain the blank 41. Also for this embodiment of FIGS. 12-13, the description given above relating to FIGS. 8 and 9, with the same reference numbers, is applicable.

Figure 13A:
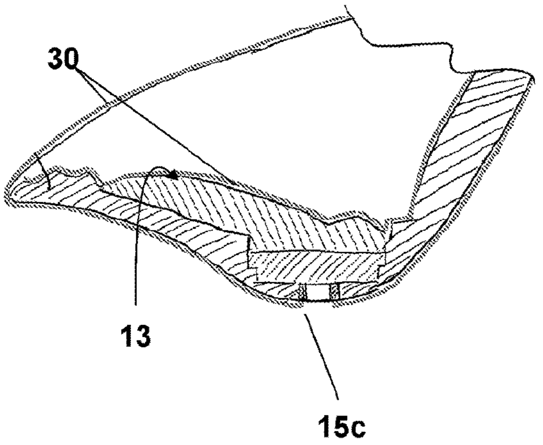
FIGS. 13A, 13B, 13C show seat variants made with the method according to the invention.

With reference to FIG. 13A in an embodiment similar to the previous ones, the seat can be alternatively supported by a single central leg, not shown. The insert 13 can be made of a single piece of wood or rigid molded plastic material. In the lower part there is a metal insert 13A arranged to guarantee a secure connection with the single central leg (not shown) which supports the chair. Through the base board the load of a sitting person will be transferred to the central leg and then to the ground. Finally, the seat board has holes, which are also made in correspondence with them on the polystyrene, for the passage of pins and for "pulling" the fabric on the back of the armchair. The resin coating completely covers the armchair and the upper part of the sitting region. This resin is used to guarantee the solid connection between the sitting region and the armchair.

Figure 13B:
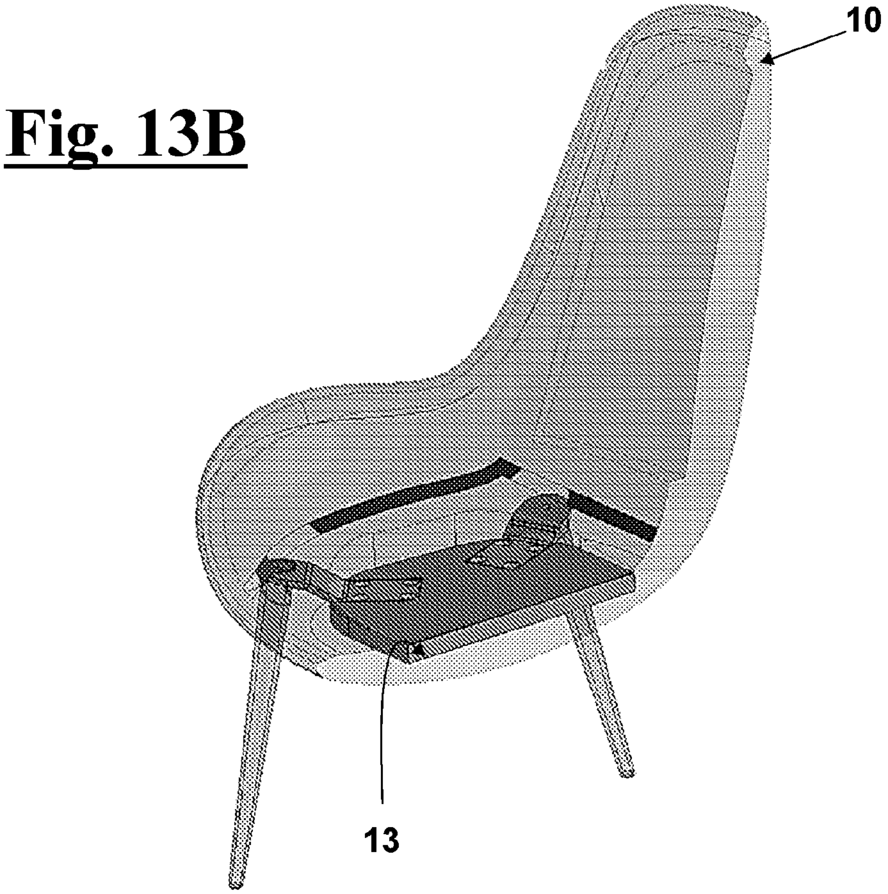
Figure 13C:
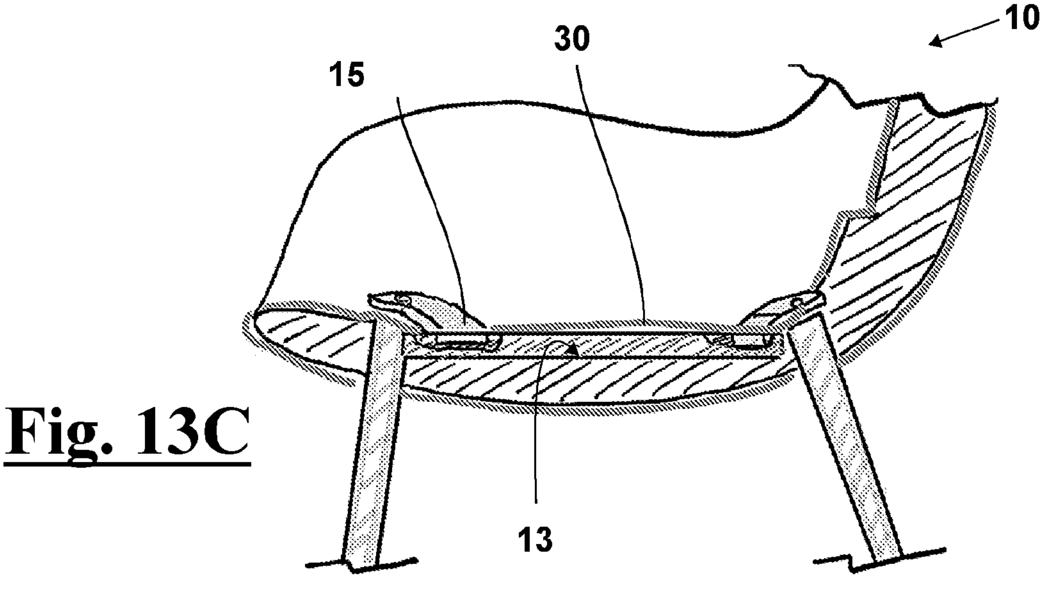

As shown in FIGS. 13B and 13C, similarly to the cases previously shown, a multi-legged chair has a milled element coupled to a seat board to which the brackets for joining the legs are fixed. The seat board serves to support the loads of the "loaded" chair and to transmit them, through the metal brackets, to the legs, and through these to the ground. The seat board is incorporated in the polystyrene blank obtained by machining with machine tools. The metal brackets, as indicated in the figures, are fixed to the seat board by means of fixing screws. On the milled polystyrene, in the lower part, there are holes for the passage of the legs that will be fixed on the metal brackets. The resin coating completely covers the upper part of the seat board and the interface surfaces between it and the polystyrene blank to connect the wood to the polystyrene solidly.

With reference to FIGS. 14-17 the piece of furniture can be a backrest 50 of a seat, formed by a backrest-shaped EPS blank 51, which can have a backrest portion 51 *a* and armrests 51 *c* similarly to the embodiments previously the illustrated in FIGS. 8-13.

In the particular embodiment of the backrest of FIGS. 14-17, the rigid insert 13 can be an arched element 53 running along the lower edge 52. Arched element 53, made of rigid material, for example wood or other structural material, can be obtained by milling from a blank containing it, or it can be made with other known techniques for wooden or laminated furniture components.

The interface surface 12 can be made by making recesses, for example grooves that extend along the lower edge 52 of the backrest blank 51, to facilitate the application and sealing of the glue that defines a first solidarization with the arched element 53. For this purpose, the rigid insert 13 having arch-shaped portion 53 has the engagement portion 14 corresponding to its own edge 54 which can be smooth or also grooved, which mates the interface surface 12 formed by the lower edge 52.

The connection portion 15 can be embodied by the lower face 55 of the arched insert 53, to which a second furniture component can be fixed, not shown for simplicity, and which can be an intermediate board to which then, legs or a base, or a frame having legs or forming a base, can be attached. Therefore, the second furniture component can be fixed, by means of furniture hardware, to the lower face 55 which acts as a connection portion 15 with principles similar to that shown in FIG. 7. By way of example, FIG. 17 shows a threaded bush or "spider" 15*a*, which can be repeated in several points along the arched element 53.

In particular, in FIG. 14 the backrest-shaped blank 51 embodies an assembly of a backrest 50 of an armchair before spraying the polyurethane coating resin layer 30, which instead is shown applied in FIG. 15. The same general steps already described for FIGS. 4-6 and also described for the embodiment of FIGS. 8 and 9, which are not repeated for the sake of simplicity, are applicable to obtain a complete solidarity of the backrest blank 51 with the arched insert 53.

As shown in FIG. 16 and in the detail of FIG. 17, the backrest blank of furniture 50 can then be covered with upholstery 37, for example of fabric or leather, preferably after partial covering with an underlying elastic layer 36, for example in rubber or foam rubber, in the back support area. The elastic layer 36 can be glued to the coating layer 30, while the upholstery 37 can be fixed by means of fasteners 35, such as for example metal elements for tapping, nailing or stapling to the rigid insert 13, from the side of connection 15, here embodied by the face 55 of the arched insert 53. This face 55 may have a central groove 55*a* useful for facilitating the seaming or stapling and containing the folds 37*a* of the leather or fabric covering layer.

In FIG. 17, for simplicity of description, the "spider" hardware 15*a* is shown on the same plane of the fastening element 35, even if it is clear that these are different planes, since the spider 15*a* is used to screw a second furniture component, such as for example a frame, a base or supporting legs.

Therefore, the rigid insert 13, here formed by arched element 53, in addition to supporting the concentrated loads transmitted by connection with another piece of furniture, also allows to support the concentrated loads of fastening the upholstery by means of fastening elements 35 or the like. The aforementioned description of the application phases of the coating 37 and of an eventual elastic layer 36 can be applied by a person skilled in the art to any piece of furniture made according to the invention, object of the present description or in any case according to the present invention. Therefore, it is understood that this description of application of the coating applies, mutatis mutandis, to the other embodiments according to the invention With reference to FIGS. 18-21, in a different embodiment of the invention, a similar piece of furniture can be a backrest 50 of a seat, formed by a backrest-shaped EPS blank 51, for which the same description relating to the embodiment of FIGS. 14-17 is applicable, which is not repeated for simplicity.

In this embodiment at least one arched reinforcement 56 which runs in a groove 52' made in the backrest can be provided. As shown in FIG. 20, the coating layer 30 of polyurethane material completely covers the arched reinforcement 56. Alternatively, as shown in the detail of FIG. 21, the coating layer 30 of polyurethane material covers only the groove 52' and acts as a glue between the arched reinforcement 56 and groove 52'.

In both cases of FIG. 20 and FIG. 21, the arched reinforcement 56 can be made of a rigid material such as wood, hardboard, rubber, cardboard, or compressed fabric, so as to support concentrate loads and permit to pin the furniture upholstery fabric or leather. This need may arise in cases where the 3D geometry of the furniture requires anchoring points for the fabric. Therefore, the position indicated in FIGS. 18-21 of the arched reinforcement 56 is purely indicative, and when necessary, several differently arranged arch reinforcements can be applied.

As shown in FIGS. 18 and 19, in particular, an arched bandage 56' can be applied externally to the arch 53. This bandage, which is also coated with polyurethane, further strengthens the arched insert 53.

With reference to FIGS. 22-24, in a variant embodiment of the invention, a similar piece of furniture can be a backrest 50 of an elongated seat, for example suitable for a sofa, formed by a backrest-shaped EPS blank 51, for which the same description and the same numbering relating to the embodiment of Figs is applicable. 14-17, which is not repeated for simplicity.

In this embodiment, in particular, reinforcing boards 57 can be provided substantially orthogonal to the arched element 53, possibly provided with braces 57' which are connected to parts of the engagement portion 12, which is embodied by recesses 52" made in the backrest-shaped blank 51. In this way, the backrest 50 is able to support concentrated connection loads both at a face 55 of the arched element 53, and at the reinforcement boards 57, where further furniture components, such as legs, bases or seats, can be connected with spider hardware 15*a* or other furniture hardware.

Figure 25:
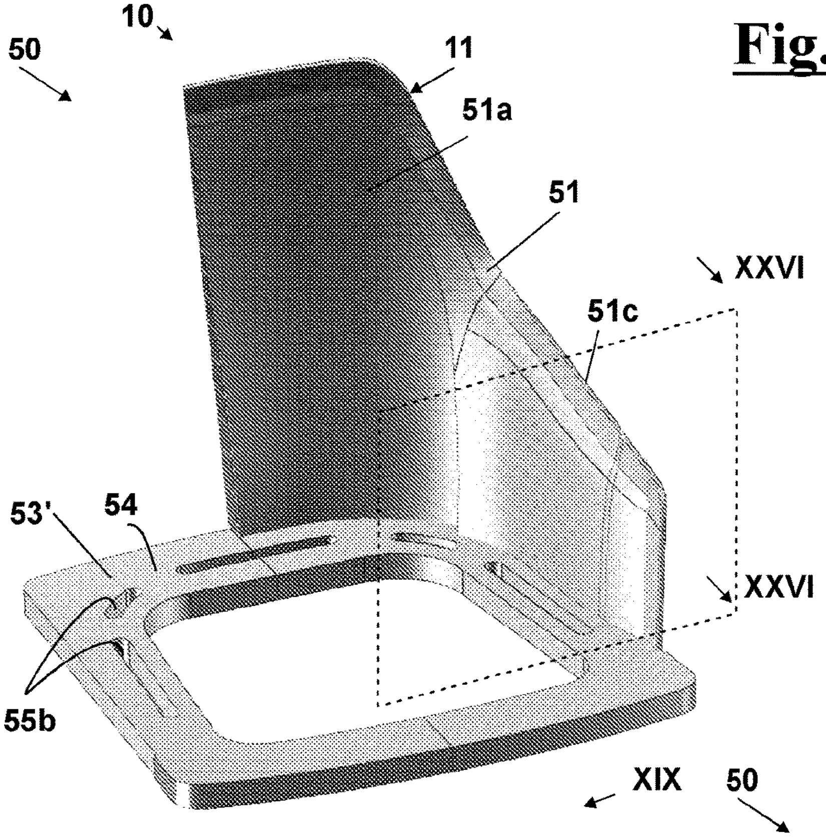
Figure 26:
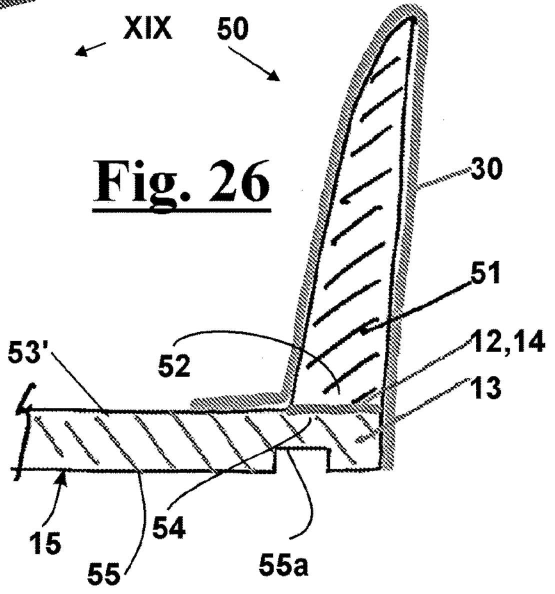
Figure 27:
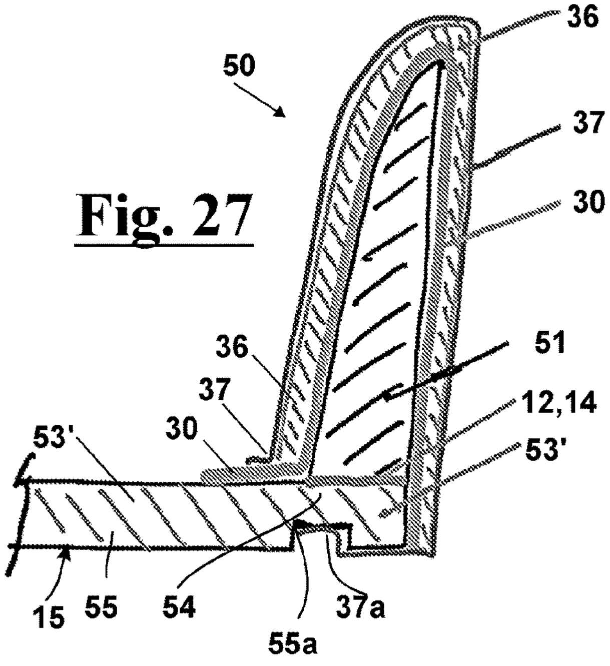
FIG. 27 shows the application of an upholstery to the seat in the same partial sectional view of FIG. 26.

Also in the alternative embodiment of the backrest of FIGS. 25-27, the furniture component can be a backrest 50 of a seat, formed by a backrestshaped EPS blank 51, which can have a backrest portion 51 *a* and armrests 51 *c* similarly to the embodiments previously illustrated in FIGS. 8-21.

In this embodiment, the rigid insert 13 can be a frame 53' having a perimeter portion 54, while the engagement portion 14 can be the perimeter portion 54 of frame 53'. In particular, the EPS backrest-shaped blank 51 has the interface surface 12 formed by the lower edge 52 which copies the perimeter portion 54, on which it rests, and to which is glued so as to become integral with the frame 53'. The engagement portion 14 corresponding to the perimeter portion 54 can be smooth, or it can also be grooved to facilitate gluing.

The rigid insert 13 in the form of frame 53' can be made of rigid material, for example wood or other structural material, and can be obtained by cutting and then milling from a blank containing it, also making grooves 55*a* for stapling and making through notches 55*b* to tie elastic straps and fix the fabric or leather.

The polyurethane resin layer 30 preferably does not cover the entire frame 53' but it covers a part of it adjacent to the perimeter portion 54, so as to greatly strengthen its solidarity with the EPS backrest blank 51.

The connection portion 15 can be embodied by the lower face 55 of the frame insert 53', to which a second furniture component can be fixed, with applicable structure similar to that shown in FIG. 7, not shown again for simplicity, and which can be for example a frame having legs or forming a base.

In particular, in FIG. 25 the backrest-shaped blank 51 embodies a backrest 50 of an armchair assembled to the frame 53' before spraying the polyurethane coating resin layer 30, which instead is shown applied in FIG. 26.

Figure 6:
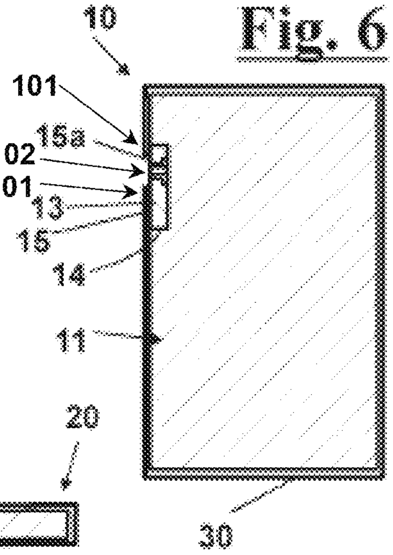

The same general steps already described for FIGS. 4-6 and described for the embodiment of FIGS. 8 and 9, which are not repeated for the sake of simplicity, are applicable, in order to obtain a complete solidarization of the backrest-shaped blank 51 to frame-shaped insert 53'.

As shown in FIG. 27, the backrest-shaped furniture component 50 can then be covered with upholstery 37, for example of fabric or leather, preferably after coating with an underlying elastic layer 36, for example in rubber or foam rubber, on the backrest surface back or even posteriorly. The same general steps already described for FIGS. 14-17 are applicable, which are not repeated for simplicity.

As shown in FIGS. 28 and 29, in a different embodiment of the invention, a similar piece of furniture can be a backrest 50 of a seat, formed by a backrestshaped EPS blank 51, for which the same description relating to the embodiment of FIGS. 25-27 is applicable, which is not repeated for simplicity.

In this embodiment variant, in addition to the frame 53', ribs 58 can be fixed which extend in grooves 59 made in the backrest blank 51. The ribs 58 can also be covered by the polyurethane resin layer 30. Ribs 58 can be substantially vertical and made of wood. The grooves 59 can be deep so as to enclose ribs 58, which can be used to connect the backrest to other interfaces or to fix covering layers such as rubber, leather, fabric.

With reference to FIGS. 29A, 29B, 29C, the assembly has a milled backrest-shaped blank, assembled, before the resin coating, to a panel for example made of "marine plywood". The marine plywood has a series of holes, in which spider hardware and bushes can be mounted, which can be used to connect the backrest to the base of a sofa or an armchair frame on which the backrest is to be mounted. The spider hardware and bushes, once mounted, are protected inside with special silicone rubber resistant against any oxidizing action of water. Once assembled, the polystyrene structure and marine plywood panel are entirely coated with resin to avoid any contact with external atmospheric agents, and mainly water, with the wooden panel and with the polystyrene. This construction method, integrated with those described above, allows the use of the product in an outdoor environment and, more generally, when there is a risk of wear by atmospheric agents.

Figure 30:
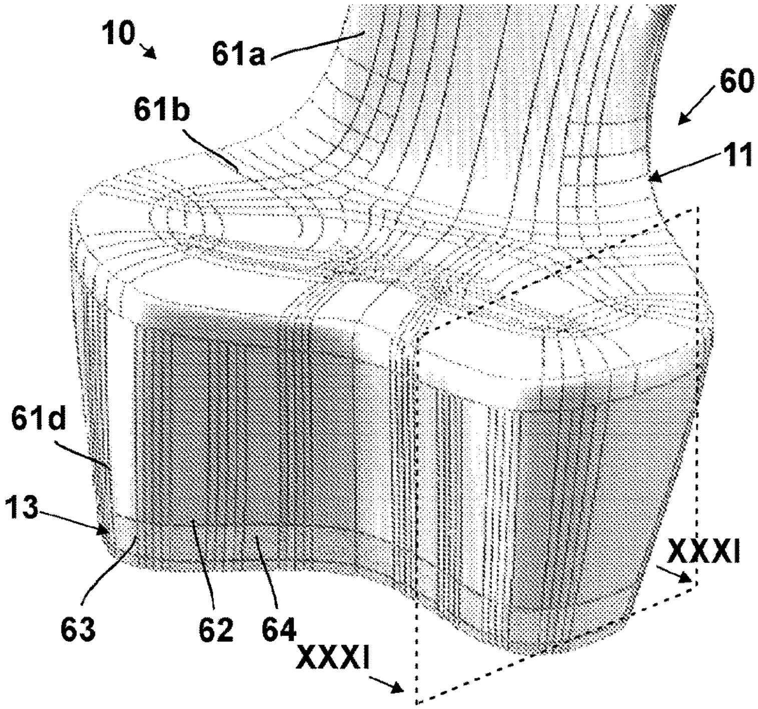
Figure 31:
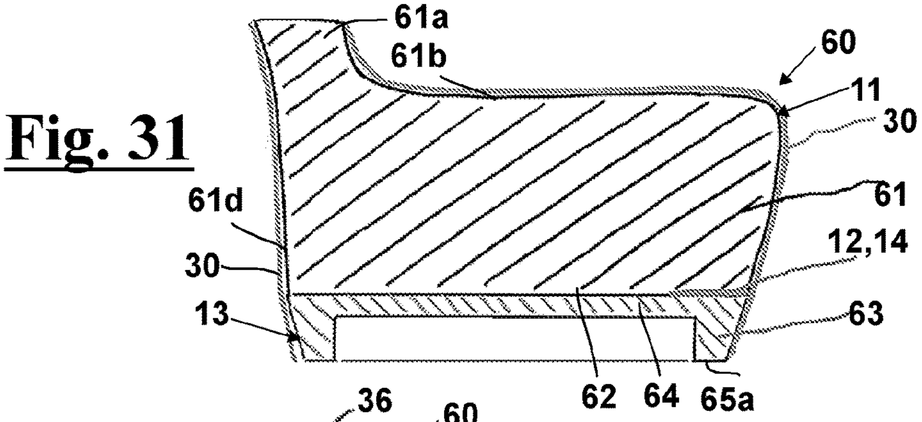
Figure 32:
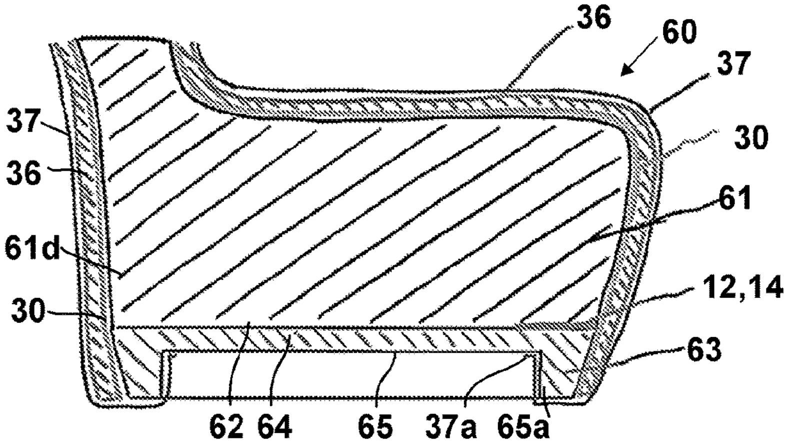
FIG. 32 shows the application of an upholstery to the seat in the same partial sectional view of FIG. 31.

With reference to FIGS. 30-32, the furniture component 10 can be a seat with a base 60, the blank 11 can be a blank of EPS with a seat with a base 61, for example a monolithic seat formed by a backrest portion 61*a*, a seat portion 61 *b*, and a base portion 61 *d*, the interface surface 12 may be the lower face 62 of the base portion 61 *d*; the rigid insert 13 can be a base reinforcement 63, or base board, which has the engagement portion 14 corresponding to its own upper face 64 configured to couple with the lower face 62 of the base portion 61 *d*. The polyurethane resin layer 30 which covers the seat-shaped blank base 61 also partially or completely covers the base reinforcement 63. The latter is solidarized with the seat with base 61 by means of glue before spraying with polyurethane, which then provides a further solidarization between them.

The base board 63 can comprise a connection portion 15 formed by a base face 65 which can contact directly with the floor by means of shaped foot elements 65*a* or can act as a connection for further foot elements which can be connected by spider hardware, screws, plates, etc., not shown. Furthermore, the base face 65 allows an upholstery 37 of leather or fabric to be fixed around it, in correspondence with folded flaps 37*a*.

As shown in FIG. 32, the seat-shaped furniture component with base 61 covered with the layer of polyurethane 30 can then be covered with upholstery 37, for example in fabric or leather, preferably after covering with an underlying elastic layer 36, for example made of rubber or foam rubber, in the back support area or even at the back. The same general steps already described for FIGS. 14-17 apply, which are not repeated for simplicity of description.

As shown in FIG. 33-35, in a different embodiment of the invention, an analogous piece of furniture can be a monolithic seat 60, formed by a seat-shaped EPS blank with base 61, for which the same description relating to the embodiment of FIGS. 30-32 is applicable, which is not repeated for simplicity.

In this embodiment the seat-shaped blank with base 61 comprises a seat portion 61 *a*, and the interface surface 12 can be made by making a recess 62' in the seat portion 61 *a*, and a further rigid insert 13 can be provided having the form of a frame element 63' and a portion of its edge 64' embodies the engagement portion 14 of the rigid insert 13.

Also in this embodiment, in addition to what already described for FIGS. 30-32, where the base insert 63 transfers directly to the ground the loads of the milled monolithic seat shaped blank 61 which rests on it, the further rigid frame insert 63' can have its own edge 64' which is inserted in the recess 62' of the seat portion 61*a* before the resin coating, to be further integrated with it. The rigid frame insert 63' can have a connecting face 65' which may include threaded screws or other threaded elements 15*a* which serve to fix, after the resin coating, a second furniture component formed by a belting board 20.

Figure 35A:
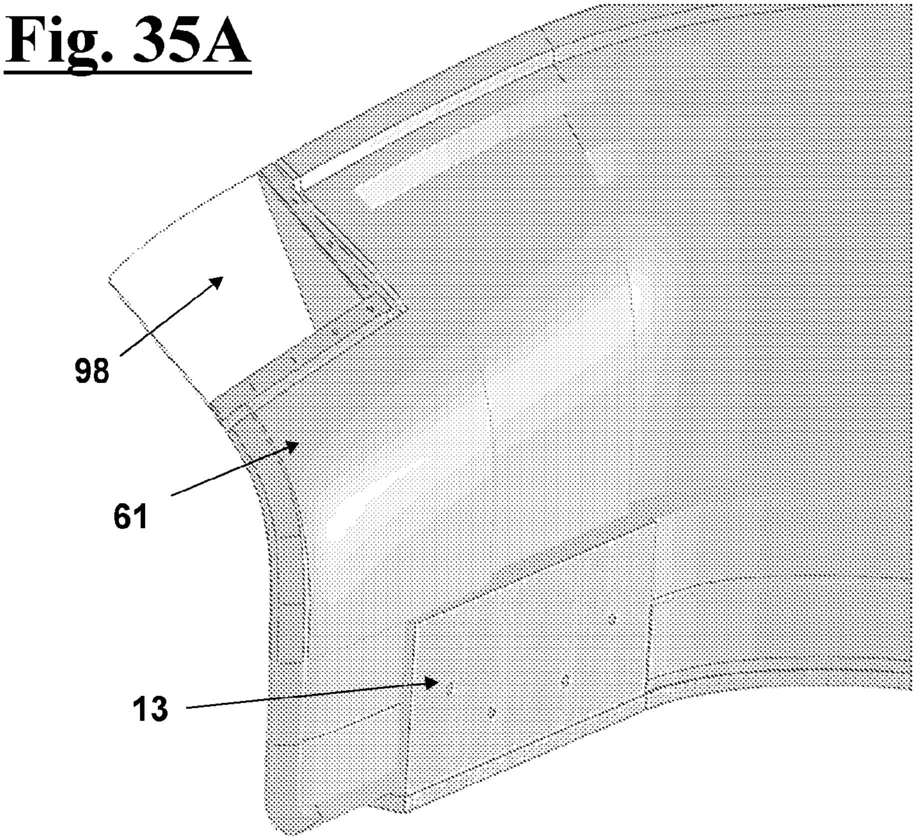
FIGS. 35A and 35B show construction variants of the armrest of a seat portion according to the invention
Figure 35B:
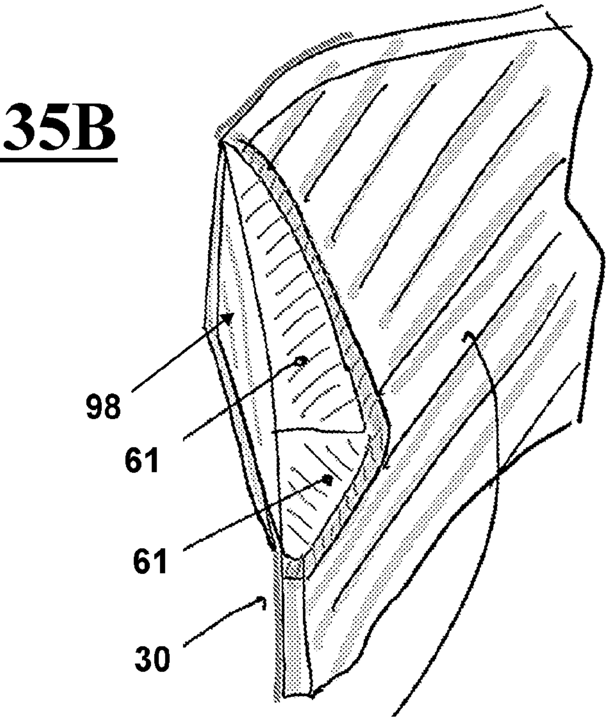

With reference to FIGS. 35A and 35B, in a seat made similar to the cases previously shown, such as a sofa or an armchair, an armrest end can be milled and coupled to a shaped panel made of flexible polycarbonate, for example 2 mm thick (but it could also be ABS, PVC or other plastic material with adequate flexibility for the purpose), connected to the armrest by means of wooden panels fixed integrally to the polystyrene through the lateral resin coating (as shown in the figure). The panels that connect the polycarbonate to the armrest support are arranged to transfer to the sofa structure the bending stress exerted by the user on the armrest. The polycarbonate can be fixed to the panels by means of metal strips and by a system of screws. Since applicable, the steps of the previous embodiments are not repeated for simplicity. The machining process of the piece is done in a similar way to the cases previously shown. The resin completely covers the armrest and connects the wooden panels to the armrest structure by means of lateral resin coating (see FIGS. 35A,35B). The polycarbonate panel is subsequently connected to the resin coating. Except in the area close to the coupling with the polystyrene, the base board is not affected by the resin coating. The lower part of the sitting table, as shown in said figures, is not resin coated.

Figure 36:
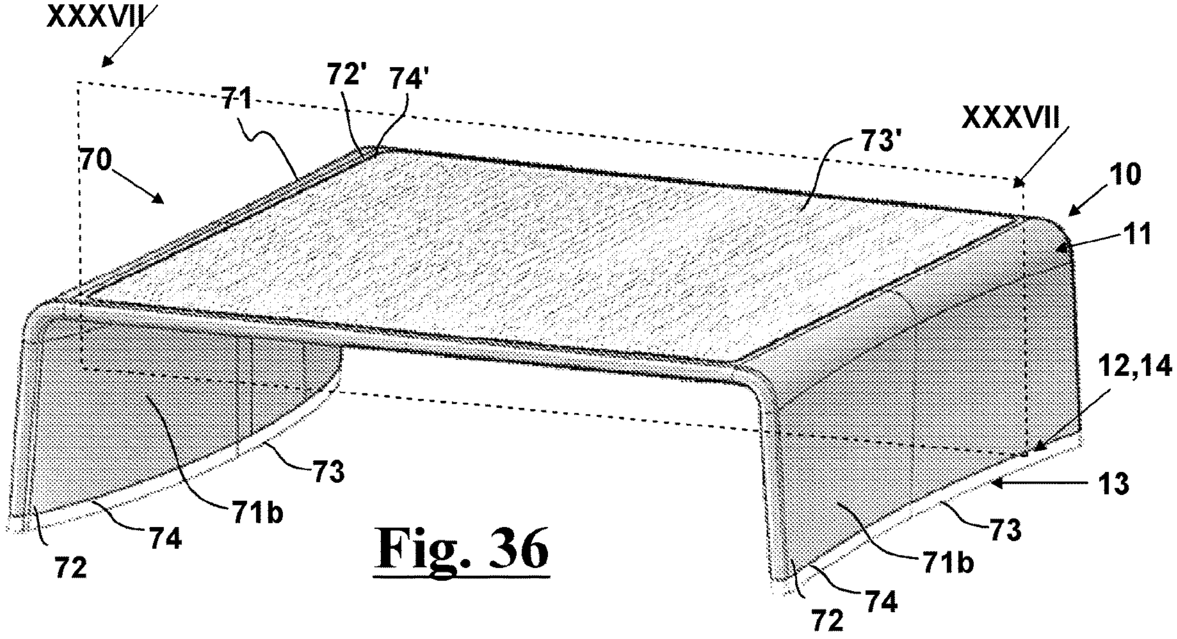
FIGS. 36 and 37 show a table, in particular, an example tea table, made with the method according to the invention and depict respectively a partial perspective view and a sectional view along XXXVII-XXXVII of FIG. 36.
Figure 37:
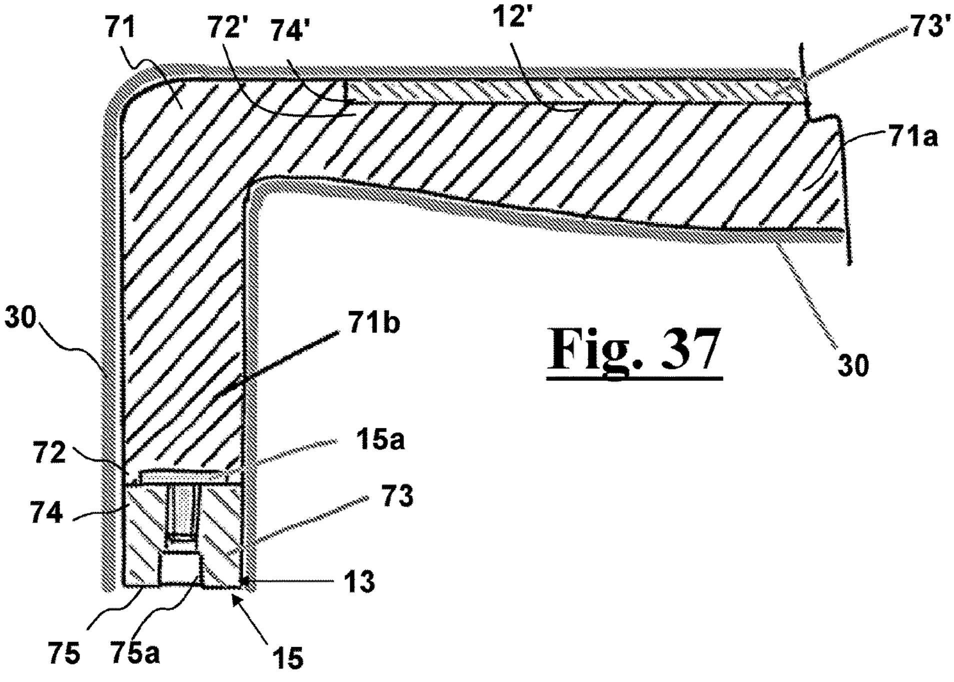

In a further embodiment, shown in FIGS. 36 and 37, the furniture component can be a table 70, the blank 11 can be a table-shaped EPS blank 71 with table top 71 *a* and legs 71 *b*, and the interface surface 12 can be formed by a lower edge 72 of the legs 71 *b*.

In this embodiment, the rigid insert 13 can be a bar 73 shaped so as to copy the lower edge 72, while the engagement portion 14 that can be an upper face 74 of the bar 73. In this case, the polyurethane resin layer 30 covers the bar at least partially adjacent to the lower edge 72. The connection portion 15 can be embodied by the lower face 75 of the bar, to which a second furniture component, or foot elements, can be fixed, by means of furniture hardware 15*a*. Hence, the blank 71 can be placed on the bars 73 which may have grooves for fixing any covering fabric or leather.

In addition, a further interface surface 12' can be provided, obtained by making a recess 72' in the table top 71 *a* in which a board element 73' is fixed along one of its edges 74'. The polyurethane resin layer 30 covers the blank at table 71 and also partially or totally covers the board element 73'.

Board element 73' can be made of wood and serves to support, together with the coating resin layer 30, the distributed and point loads that may arise during the use of the table. The upper board element 73' can therefore be "incorporated" in the recess 72' made by milling in the table-shaped EPS blank 71 and also incorporated under the coating resin layer 30.

Figure 38:
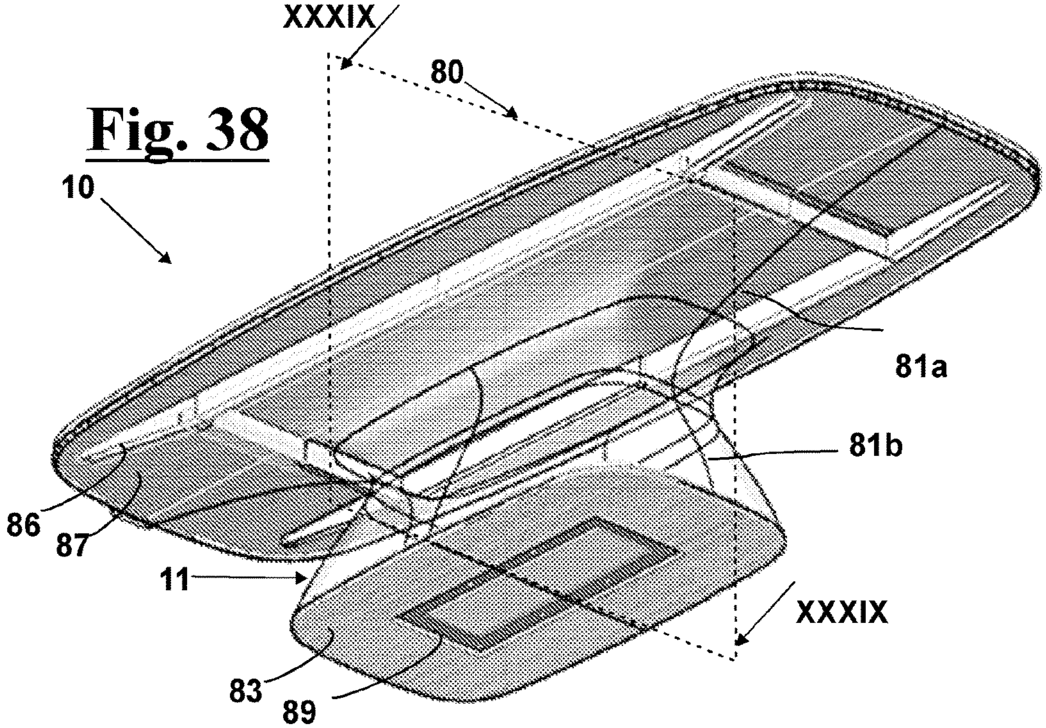
FIGS. 38 and 39 show an example table made with the method according to the invention, and depict respectively a perspective view from below and a sectional view along XXXIX-XXXIX of FIG. 38.
Figure 39:
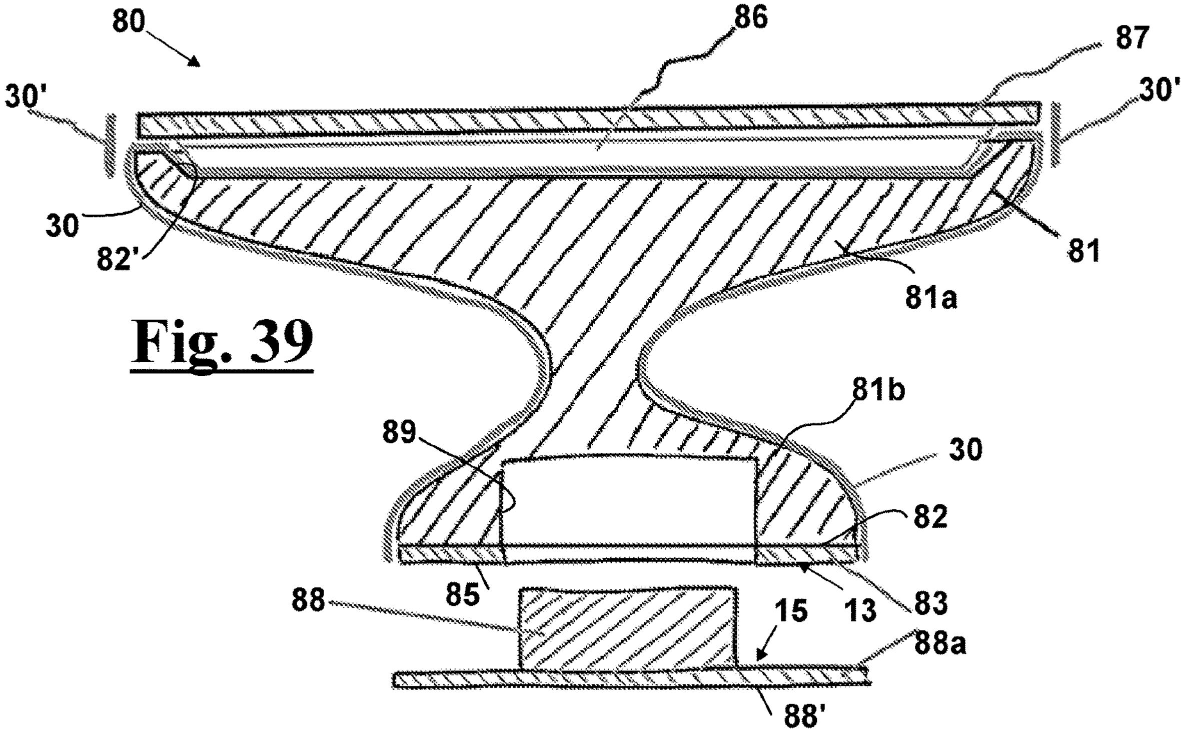

With reference to FIGS. 38-39, the furniture component 10 can be a table 80 and the blank 11 can be in the form of a monolithic table 81 comprising a table top 81 *a* and a central base 81 *b*.

In this embodiment, the interface surface 12 can be a flat perimeter surface 82 or a perimeter recess under the base 81 *b* and the rigid insert 13 can be embodied by a base board 83, while the engagement portion 14 can be the upper face of the base board 83, or at least a portion of the edge 84 of the base board 83.

The connection portion 15 can be embodied by the lower face 85 of the base board 83 to which a second furniture component 20 can be fixed, such as a ballast 88, for example of metal. In particular, the ballast 88 can be placed above a support board 88*a* and engageable in a further recess 89 in the base 81 *b*. The base board 83 has the lower face 85 from which spider hardware, bushings or other furniture hardware can emerge, to connect, as a second furniture component 20, while the ballast 88 can be connected to the base board 83 by means of the support board 88*a*.

The polyurethane resin layer 30 which covers the blank 81 also covers the base board 83 laterally. The base board 83 had already been solidified with the blank 81 by means of glue before spraying with polyurethane 30, which therefore provides a further solidarization.

Furthermore, in this embodiment a second connection portion 88' can be made on the lower face of the support board 88*a* for the connection, by means of furniture hardware, of foot elements, not shown.

In a possible embodiment, again with reference to FIGS. 38 and 39, it an upper interface surface 82' can be made in the table top 81*a*, and an upper reinforcing element 86, substantially with a frame or stretcher, in rigid material, can be provided. In this case, a layer of resin 30 can be applied to the whole Monolithic table-shaped EPS blank 81, also covering the upper interface surface 82' before applying the upper reinforcing element 86, so that the latter adheres to it, for example before crosslinking I solidification of the resin. Therefore, the application of an upper table 87 on the upper reinforcing element 86 and the application of a second layer of resin 30' between the table top 81 *a* and the upper table 87 can be provided.

Figure 40:
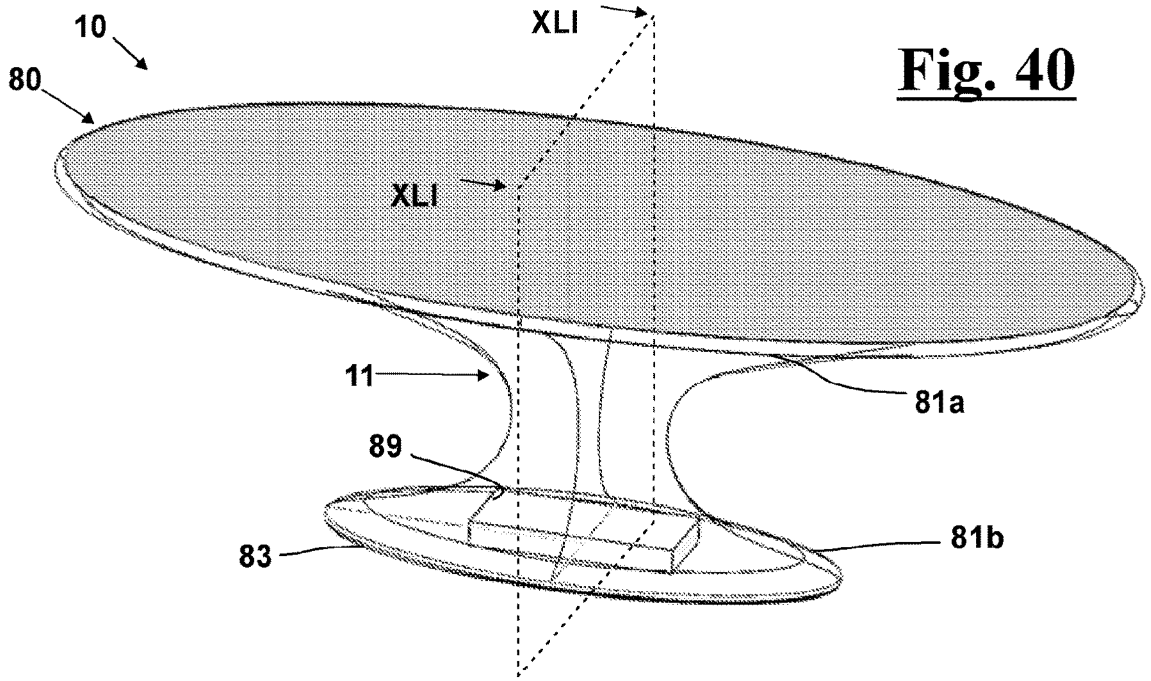
Figure 41:
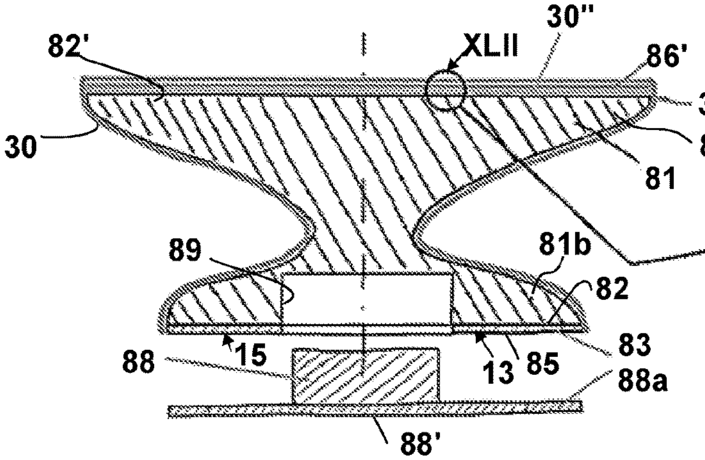
Figure 42:
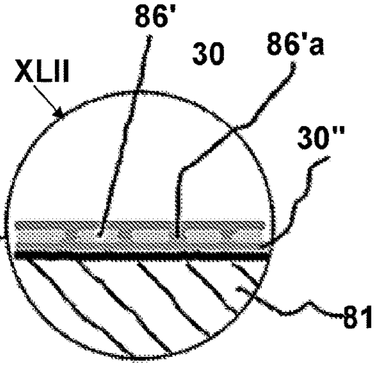
FIG. 42 is a detail corresponding to an enlargement zone XLII of FIG. 41.

In a further embodiment, shown in FIGS. 40-42, the furniture component 10 can always be a table 80 and the blank 11 can be in the form of a monolithic table 81 comprising a table top 81 *a* and a central base 81 *b*, the same description relating to the embodiment of FIGS. 38-39 is applicable, which is not repeated for simplicity.

In this embodiment, an upper interface surface 82' in the table top 81 *a*, and an upper reinforcing element in the form of a board 86' can be provided. In this case, the application of a coating 30" of polyurethane resin on the upper interface surface 82' can be provided before the application of the upper reinforcing board element 86'. Therefore, the application of the polyurethane coating resin layer 30 which covers the upper reinforcing element on the board 86' and also the whole monolithic table-shaped blank 81 and laterally the insert 83 can be provided. In a possible variant, the upper board 86' can be drilled with holes 86'*a*, to allow the polyurethane coating resin layer 30 to penetrate it for solidarization to the underlying resin layer 30".

With reference to FIGS. 43-45, in a further embodiment, made in a similar way to those above described the furniture component 10 can be a base or central leg for a table or coffee table, with a milled blank coupled to an upper board (not shown), to a lower board and to a plurality of lateral magnets 99. The upper board serves to support the distributed and concentrated loads that can derive from the upper support surface, and the lower board serves to transfer the load on the ground and to carry a metal ballast which serves to ensure stability to the table leg, and therefore to the table itself. The lateral magnets 99 serve to make a connection (magnetic) with other similar legs, with which they will be connected together, and which all together serve to support the table. The upper board is "incorporated" in a groove made by milling the blank, while the leg is then placed on the ground. The lower board provides table provides spider hardware for attaching adjustable foot elements. The steps of the previous embodiments are applicable and not described further. The milled polystyrene is glued to the boards at the table top and bottom, which are equipped with hardware (spiders, screws, plates, etc.) for joining the table to the foot elements with an aesthetic function. The metal ballast can be fixed to the lower board by means of connecting screws. The milled blank also provides recesses in which cylindrical magnets are housed, with appropriate polarity, which serve to connect, following the resin coating, the legs together. The covering resin entirely covers the upper part of the leg, to connect the upper wood to the polystyrene integrally, while the lower board is connected to the polystyrene only through the lateral surface. The magnets are glued into the recesses of the polystyrene blank and then protected by a paper tape, then they are sprayed externally to connect them solidly by the polyurethane coating to the polystyrene blank including the upper board. Except in the area close to the coupling with the polystyrene, the base board may not be coated by the polyurethane resin. The lower part of the interface foot elements is not resin-coated. In FIG. 45 on the side, another constructive solution is shown that makes use of magnets. Also in this case the magnets are incorporated, through the use of resin, into the body of the blank and serve to connect the furniture component to other similar or different elements.

With reference to FIGS. 46-48, in a further embodiment, the furniture component 10 can be a portion of the chaise longue 90 and the blank 11 can be a shaped monolithic semifinished product 91.

In a possible embodiment, the interface surface 12 can be a lateral face 92 of the shaped monolithic blank 91 and the rigid insert 13 can be a rigid profile 93 that copies the shaped portion 91 so as to couple with the lateral face 92. The engagement portion 14 can be the lateral edge 94 of the rigid profile 93 while the connection portion 15 can be the connecting face 95 of the rigid profile 93 opposite the lateral edge 94.

In the possible embodiment shown, in particular, a second furniture component 90' provided that can be an identical shaped monolithic EPS blank 9T which shares the rigid profile 93. The polyurethane coating layer 30 integrates the first and the second furniture component 90 and 90' with rigid profile 93.

Furthermore, the chaise longue-shaped monolithic blank 91 can have lower ends 92' which provide a further insert 93' whose edge 94' embodies the engagement portion 14 which engages with the end 91 *a*, while the polyurethane coating layer 30 integrates the insert 93' with the ends 92'.

The semi-finished monolithic shaped chaise longue 91 can be a milled EPS element while the inserts 93 and 93' can be a longitudinal wooden board milled according to an identical shape and two opposite wooden base foot elements. The semi-finished monolithic shaped chaise longue 91 and 91 'and the inserts 93 and 93' are glued together and then further solidarized with the polyurethane coating layer 30. The insert 93 has the function of stiffening the structure and balancing any "shrinkage" of the polyurethane coating layer 30 in the when curing. This allows creating monolithic blanks shaped like a chaise longue 91 and 91' as milled parts made of EPS, i.e. two distinct parts avoiding undercuts, since the two blanks can be milled resting on one side.

Further foot elements not shown can be mounted using furniture fasteners on connecting faces 95' of the inserts 93', which support the concentrated loads of the foot elements and allow the fabric or leather 37 to be stapled as indicated in FIG. 48, in grooves 95'*a*.

The above description of embodiments of the invention is able to show the invention from the conceptual point of view so that others, using the known art, will be able to modify and I or adapt these forms in various applications specific embodiments without further research and without departing from the inventive concept and, therefore, it is understood that such adaptations and modifications will be considered as equivalent to the specific embodiments. The means and materials for carrying out the various functions described may be of various nature without thereby departing from the scope of the invention. It is understood that the expressions or terminology used have a purely descriptive purpose and, therefore, are not limiting.

The invention claimed is:

1. A method for producing a piece of furniture selected from the group consisting of a seat, a bed, a table, said piece of furniture comprising at least one furniture component, said method comprising the steps of:

making a blank of expanded polystyrene with a density between 15 and 25 kg/m$^3$, said blank being configured to act as a core for said at least one furniture component;

making an interface surface in said blank;

making a rigid insert, wherein said rigid insert comprises having an engagement portion configured to engage with said interface surface of said blank and also comprises a connection portion opposite to said engagement portion;

connecting said rigid insert and said interface surface so that said engagement portion is engaged with said interface surface and said connection portion is arranged opposite to said blank apart from said interface surface; and coating said blank and said rigid insert by at least one coating layer of polyurethane material, so that said at least one coating layer entirely covers said blank and partially covers said rigid insert with the exception of at least one exception portion of said connection portion and so that said exception portion is left free from said at least one coating layer and free from said interface surface, wherein said at least one coating layer has a hard and glassy consistency and said coating step arranges said at least one coating layer to coat said connection portion all around said exception portion creating a hard shell bridge which integrally connects said blank and said rigid insert along a joint line therebetween, allowing the rigid insert to be solidly and stably attached to the blank hard shell bridge and allowing said exception portion at the same time to be free from said interface surface and surrounded by said hard shell bridge.

2. The method according to claim 1, wherein:

said furniture component is a seat;

said blank is a blank comprising a backrest portion and a seat portion, said interface surface is obtained by making a recess in said seat portion;

said rigid insert is a board element and a portion of an edge of said board element embodies the engagement portion of said insert, said connection portion is embodied by a lower face of said board element, to which a second furniture component, is fixed by means of furniture hardware, wherein said at least one coating layer of polyurethane material completely covers said seat-shaped blank and said board element with the exception of said at least one exception portion of said lower face;

wherein said engagement portion is selected from:

a whole edge of the board element;

one part of an edge of the board element, while another part of the edge forms a free edge of the seat.

3. The method according to claim 1, wherein:

said furniture component is a backrest of a seat;

said blank is a backrest-shaped blank;

said interface surface is formed by a lower edge of said backrest-shaped blank;

said rigid insert is an arched element having a shape that copies said lower edge;

said engagement portion is an upper edge of said arched element;

said connection portion is embodied by a lower face of said arched element, to which a second furniture component is fixed; and said at least one coating layer of polyurethane material completely covers said backrest-shaped blank and said arched element with the exception of said exception portion which is a portion of said lower face.

4. The method according to claim 1, wherein:

said furniture component is a backrest of a seat;

said blank is a backrest-shaped blank;

said interface surface is formed by a lower edge of said backrest-shaped blank;

said rigid insert is a frame having a perimeter portion that copies said lower edge;

said engagement portion is said perimeter portion of said frame;

and wherein said coating layer of polyurethane material covers at least one part of said frame adjacent to said perimeter portion;

said connection portion is embodied by a lower face of said frame, to which a second furniture component is fixed.

5. The method according to claim 1, wherein:

said furniture component is a seat;

said blank is a seat-shaped blank arranged as a monolithic seat formed by a backrest portion, a seat portion, armrest portions, and a base portion;

said interface surface is a lower face of the base portion;

said rigid insert is a base reinforcement which provides an upper face configured to couple with the lower face of the base portion, in such a way that said upper face embodies said engagement portion;

and wherein said coating layer of polyurethane material covers said seat-shaped blank and also partially covers said base reinforcement.

6. The method according to claim 1, wherein:

said piece of furniture is a table;

said blank is a table-shaped blank with table top and legs;

said interface surface is formed by a lower edge of said legs; said rigid insert is a bar arranged to copy said lower edge;

said engagement portion is an upper face of said bar;

and wherein said at least one coating layer of polyurethane material covers said bar at least partially adjacent to said lower edge; and said connection portion is embodied by a lower face of said bar, to which a second furniture component is fixed.

7. The method according to claim 1, wherein:

said furniture component is a table;

said blank is a monolithic table-shaped blank comprising a table top and a base;

said interface surface is a perimeter recess in said base;

said rigid insert is a base board;

said engagement portion is at least a portion of an edge of the base board; and the connection portion is a central part of an upper face of the base board to which a second furniture component is fixed as a ballast, wherein said second furniture component is placed above a support board and is engaged in a further recess in the base.

8. The method according to claim 1, wherein:

said furniture component is a portion of a chaise longue;

said blank is a monolithic blank;

said interface surface is a lateral face of said monolithic blank;

said rigid insert is a rigid profile which copies said lateral face of said monolithic blank so as to couple with said lateral face;

said engagement portion is a lateral edge of said rigid profile; and said connection portion is a connecting face of said rigid profile opposite to said lateral edge.

9. The method according to claim 1, wherein said at least one furniture component is a first furniture component comprising the rigid insert with the connection portion, and a second furniture component is provided, said method further comprising the steps of:

making said second furniture component, so that said second furniture component comprises an additional insert made of a rigid material, said additional insert having an additional connection portion configured to be connected with said connection portion of said first furniture component; and integrally connecting said first furniture component and said second furniture component by integrally connecting said rigid insert of said first furniture component and said additional insert of said second furniture component by connecting said connection portion to said additional connection portion.

10. The method according to claim 9, wherein said blank is a first blank, said method further comprising the steps of:

making a second blank of expanded polystyrene with a density between 15 and 25 kg/$m^3$, said second blank being configured to act as a core for said second furniture component;

making an additional interface surface in said second blank;

making said additional insert, wherein said additional insert comprises an additional engagement portion configured to engage with said additional interface surface and also comprises said additional connection portion opposite to said additional engagement portion;

arranging said additional insert on said additional interface surface so that said additional engagement portion is engaged with said additional interface surface and said additional connection portion is arranged apart from said additional interface surface; and coating said second blank and said additional insert by at least one additional coating layer of polyurethane material, so that said at least one additional coating layer of polyurethane material entirely covers said second blank and partially covers said additional insert with the exception of at least one additional exception portion of said additional connection portion so that said at least one additional exception portion is left free from said at least one additional coating layer of polyurethane material and free from said interface surface, wherein said at least one additional coating layer of polyurethane material has a hard and glassy consistency and said coating step arranges said at least one additional coating layer of polyurethane material to coat said additional connection portion all around said at least one additional exception portion creating an additional hard shell bridge which integrally connects said second blank and said additional insert along a joint line therebetween, allowing the additional insert to be solidly and stably attached to the additional hard shell bridge and allowing said additional exception portion at the same time to be free from said additional interface surface and surrounded by said hard shell bridge.

* * * * *